(12) United States Patent  
Forst

(10) Patent No.: US 8,469,059 B1  
(45) Date of Patent: Jun. 25, 2013

(54) FLUID DIVIDER VALVES

(75) Inventor: Michael John Forst, Taylors, SC (US)

(73) Assignee: Delavan Inc., West Des Moines, IA (US)

( * ) Notice: Subject to any disclaimer, the term of this patent is extended or adjusted under 35 U.S.C. 154(b) by 947 days.

(21) Appl. No.: 12/561,722

(22) Filed: Sep. 17, 2009

(51) Int. Cl.
*F16K 11/06* (2006.01)

(52) U.S. Cl.
USPC ........... 137/883; 137/862; 137/874; 137/884; 137/595

(58) Field of Classification Search
USPC ................. 137/883, 872, 861, 862, 874, 602, 137/887, 884, 876, 595, 607, 606, 867, 625.68
See application file for complete search history.

(56) References Cited

U.S. PATENT DOCUMENTS

| | | | | |
|---|---|---|---|---|
| 4,119,062 A | * | 10/1978 | Trevaskis et al. | ........... 123/25 R |
| 4,258,544 A | | 3/1981 | Gebhart et al. | |
| 4,535,821 A | * | 8/1985 | Anderson | ...................... 137/884 |
| 5,069,583 A | * | 12/1991 | Caldwell | ...................... 137/874 |

OTHER PUBLICATIONS

CP Profile Seal, web page from Parker Hannifin Corp., 2009; www.parker.com, accessed on Dec. 12, 2009.

* cited by examiner

*Primary Examiner* — Kevin Lee
(74) *Attorney, Agent, or Firm* — Edwards Wildman Palmer LLP; Scott D. Wofsy; Joshua L. Jones

(57) ABSTRACT

A fluid divider valve includes a housing defining a longitudinal bore having a fluid inlet. The housing defines a plurality of outlets in fluid communication with the longitudinal bore. A valve shaft is sealingly engaged within the longitudinal bore of the housing. The valve shaft has an internal longitudinal flow passage in fluid communication with the fluid inlet of the housing. The valve shaft has a plurality of radial fluid ports formed therein which extend from the internal longitudinal flow passage to an exterior portion of the valve shaft. The valve shaft is mounted for movement relative to the housing between a first position in which the valve shaft permits fluid communication between the fluid inlet and each of the outlets simultaneously through the radial fluid ports of the valve shaft, and a second position in which the valve shaft prevents fluid communication between the fluid inlet and the outlets.

20 Claims, 21 Drawing Sheets

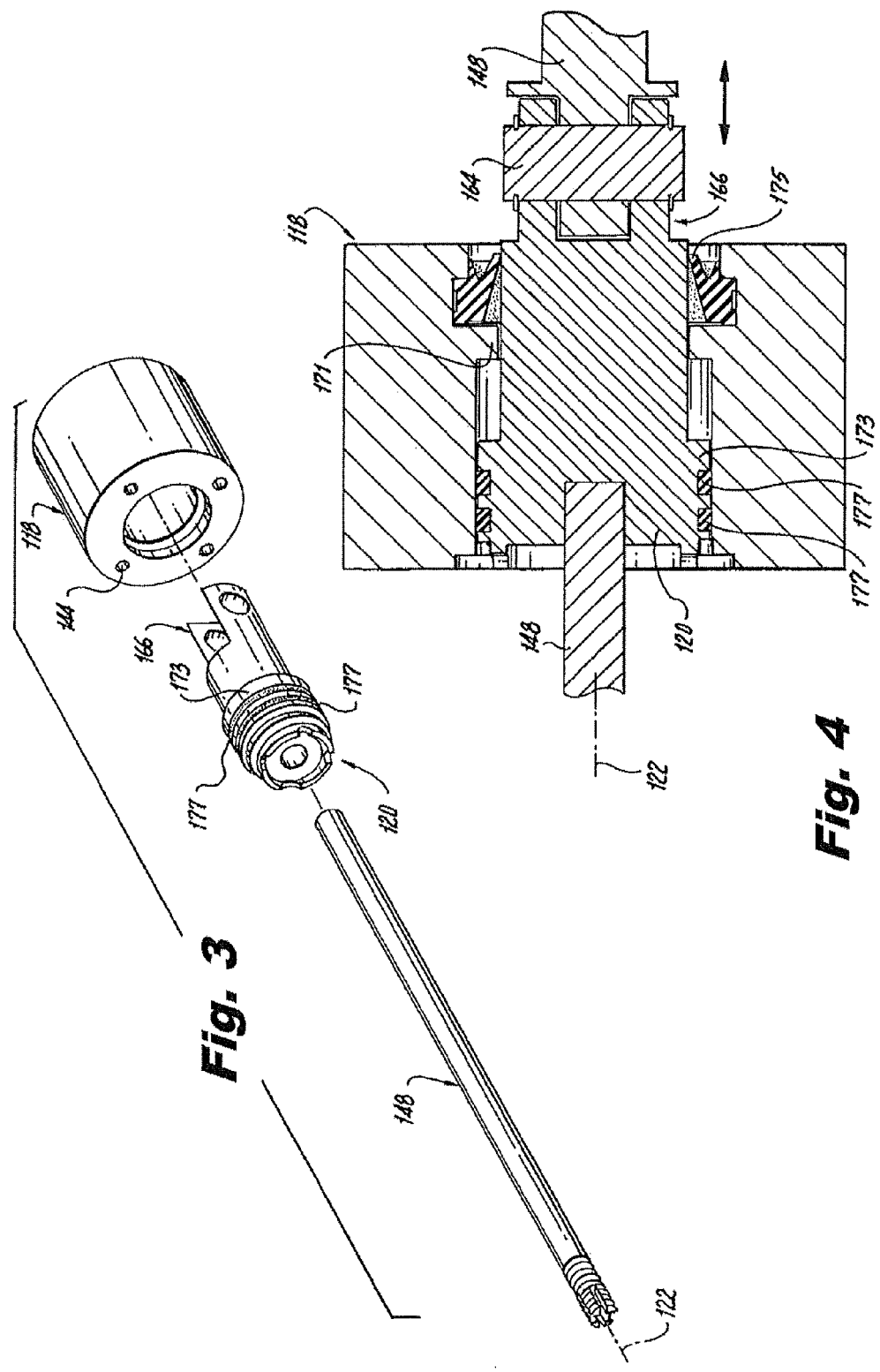

FLUID DIVIDER VALVES

BACKGROUND OF THE INVENTION

1. Field of the Invention

The present invention relates to valves, and more particularly to fluid divider valves for selectively controlling fluid flow to multiple outlets simultaneously.

2. Description of Related Art

Some gas turbine engines are configured to utilize different fuels from multiple fuel systems. For example, gas turbine engines used for power generation have been configured to selectively operate on either gaseous fuel, such as natural gas, or liquid fuel, such as Diesel or any other suitable liquid petroleum product. The operator of such an engine can choose to operate on gaseous fuel or liquid fuel based on whichever fuel is the most available or cost effective at any given time.

Other dual-fuel gas turbine engines use a first fuel for start up and a second fuel after start up. For example, certain dual-fuel gas turbine engines for an aircraft use a first fuel during start up that is of a type known to ignite readily, such as a pre-atomized liquid fuel or a gaseous fuel. After start up, the dual-fuel engine can switch to a less volatile fuel that is more economical. U.S. Pat. No. 4,258,544 to Gebhardt et al. describes dual-fuel gas turbine engines of the type just described, and provides for dual fluid fuel nozzles used to selectively inject two different fuels into the combustor of a gas turbine engine.

In many conventional dual-fuel gas turbine engines using gaseous and liquid fuels, there is a manifold for the liquid fuel system that distributes fuel from a liquid fuel supply line to multiple liquid fuel injectors. When operating on gaseous fuel, the liquid fuel manifold is not pressurized with liquid fuel. This permits cross talk, which is the pumping of gaseous combustion products from the combustor back through the liquid fuel injectors, supply lines, and manifold due to small differential pressures between the injector outlets. Some components of combustion, when combined with water, produce compounds such as $H_2SO_4$ that are corrosive. Corrosive compounds degrade engine components and reduce their operational life. In short, cross talk in the liquid fuel manifold leads to a reduction in the operational life for components in typical dual-fuel engines.

Conventional methods and systems used in multiple fuel gas turbine engines have generally been considered satisfactory for their intended purpose. However, it would be advantageous to isolate each liquid fuel injector and supply line from the others and thus eliminate corrosive cross talk when such an engine is operating on gaseous fuels. The present invention provides a solution for these problems.

SUMMARY OF THE INVENTION

The subject invention is directed to a new and useful a fluid divider valve. The fluid divider valve includes a housing defining an internal longitudinal bore having a fluid inlet for receiving fluid. The housing defines a plurality of outlets in fluid communication with the longitudinal bore for distributing fluid to a plurality of fluid injectors.

A valve shaft is sealingly engaged within the longitudinal bore of the housing. The valve shaft has an internal longitudinal flow passage extending therethrough in fluid communication with the fluid inlet of the housing. The valve shaft has a plurality of radial fluid ports formed therein which extend from the internal longitudinal flow passage to an exterior portion of the valve shaft. The valve shaft is mounted for movement relative to the housing between a first position in which the valve shaft permits fluid communication between the fluid inlet of the housing and each of the outlets of the housing simultaneously through the radial fluid ports of the valve shaft, and a second position in which the valve shaft prevents fluid communication between the fluid inlet and the outlets of the housing.

In accordance with certain embodiments, the fluid divider valve further includes a drive assembly engaged with the housing. The drive assembly has an actuator that is operably connected to the valve shaft. The actuator is configured and adapted to move the valve shaft between the first and second positions linearly along a longitudinal axis defined by the longitudinal bore of the housing. In certain embodiments, the actuator is configured and adapted to move the valve shaft between the first and second positions rotationally about a longitudinal axis defined by the longitudinal bore of the housing.

The valve shaft can include an o-ring seal disposed thereon circumferentially aligned with and spaced apart from each radial fluid port for providing sealing engagement between the valve shaft and the longitudinal bore of the housing. It is also contemplated that the valve shaft can include a plurality of seals each disposed around the valve shaft circumferentially providing sealing engagement between the valve shaft and the longitudinal bore of the housing. The seals can be self-energizing seals.

In accordance with another aspect of the fluid divider valve, an inlet fitting can be provided engaged to the housing in fluid communication with the fluid inlet of the housing for connecting the housing to a source of pressurized fluid. In another aspect, the fluid divider valve can include a plurality of outlet fittings, wherein one outlet fitting is engaged with the housing in fluid communication with a respective one of the outlets of the housing for connecting the housing to a supply line of an injector external to the housing. Each outlet fitting can include a metering orifice.

The invention also provides a valve divider block for a fluid divider valve. The divider block includes a housing defining an internal longitudinal bore extending therethrough from a first end to a second end of the housing. The housing defines at least one outlet in fluid communication with the longitudinal bore. The housing is configured and adapted to be connected end to end with adjacent housings to form a divider block assembly.

A valve shaft is sealingly engaged within the longitudinal bore of the housing. The valve shaft has an internal longitudinal flow passage extending therethrough. The valve shaft has at least one radial fluid port formed therein which extends from the internal longitudinal flow passage to an exterior portion of the valve shaft. The valve shaft is mounted for movement relative to the housing between a first position in which the valve shaft permits fluid communication along a flow path from the internal longitudinal fluid passage through the at least one radial fluid port of the valve shaft to the at least one outlet of the housing, and a second position in which the valve shaft prevents fluid communication along the flow path.

In certain embodiments, the housing includes a face seal disposed around an opening of the longitudinal bore in the first end of the housing. The second end of the housing can be configured to sealingly engage the face seal of an adjacent valve divider block. The housing can define at least one assembly bore substantially parallel to the longitudinal bore thereof, wherein the assembly bore is configured to receive a through bolt or tie rod therethrough for fastening a plurality of divider blocks end to end.

The valve shaft can be configured to connect end to end with valve shafts of adjacent divider blocks to transfer forces along the valve shafts to move the connected valve shafts between the first and second positions. It is also contemplated that the housing can include two outlets wherein each outlet includes an outlet fitting in fluid communication therewith for connecting the outlet to a supply line of an injector.

The invention also provides a fluid divider valve that includes a divider block assembly with a plurality of divider block units. Each divider block unit includes a housing having at least one outlet in fluid communication with a longitudinal bore extending through the housing. The housings are sealingly assembled or ganged together in a series.

Each divider block unit includes a valve shaft sealingly engaged within the longitudinal bore of the housing. The valve shaft has an internal longitudinal flow passage extending therethrough and has at least one radial fluid port formed therein which extends from the internal longitudinal flow passage to an exterior portion of the valve shaft. The valve shaft is mounted for movement relative to the housing between a first position in which the valve shaft permits fluid communication along a flow path from the internal longitudinal fluid passage through the at least one radial fluid port of the valve shaft to the at least one outlet of the housing, and a second position in which the valve shaft prevents fluid communication along the flow path. Each valve shaft is connected in series for movement as a single valve shaft unit.

The fluid divider valve also includes an inlet assembly sealingly engaged to a first end of the divider block assembly. The inlet assembly is in fluid communication with the internal flow passages of the valve shafts. A drive assembly is engaged with a second end of the divider block assembly. The drive assembly includes an actuator operably connected to the valve shaft unit. The actuator is configured and adapted to move the valve shafts between the first and second positions.

The fluid divider valve assembly can further include a tension rod having a first end operably coupled to the actuator of the drive assembly and a second end operably coupled to the valve shaft unit of the divider assembly. The tension rod runs through the internal longitudinal flow passages of the valve shafts of the divider assembly compressing the valve shafts together end to end such that the valve shafts are configured for movement between the first and second positions as a single unit in a linear direction along an axis defined by the tension rod. An end cap can connect the second end of the tension rod to an end of the valve shaft unit. The end cap defines at least one fluid port therethrough providing fluid communication from the inlet assembly to the internal longitudinal flow passages of the valve shafts.

In another aspect, the housing of each divider block unit includes two outlets and each valve shaft includes at least one radial port proximate each outlet, wherein each valve shaft includes a plurality of seals disposed circumferentially around the valve shaft to seal the radial ports from the outlets in the second position. It is also contemplated that the housing of each divider block unit can include two outlets, wherein each valve shaft includes at least one radial port proximate a first one of the two outlets, and wherein each valve shaft includes a partial radial port defined in an end thereof. The partial radial port forms a radial port with the end of an adjacent valve shaft that is proximate the second of the two outlets in the respective housing. The first end of the tension rod can be coupled to the actuator of the drive assembly by a clevis and pin connection.

In accordance with certain embodiments, each of the valve shafts includes drive tangs on a first end thereof and drive slots on a second end thereof. The drive tangs are configured to mesh with drive slots of an adjacent valve shaft to provide rotational engagement of the valve shafts with one another. The valve shafts are configured for rotational movement between the first and second positions as a single unit in a rotational direction about an axis defined by the internal longitudinal flow passages. The actuator is configured and adapted to rotate the valve shaft between the first and second positions.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will more readily understand how to make and use the devices and methods of the subject invention without undue experimentation, preferred embodiments thereof will be described in detail herein below with reference to certain figures, wherein:

FIG. 3 is an enlarged perspective view of a portion of the fluid divider valve of FIG. 1, showing a portion of the drive assembly exploded;

FIG. 4 is a cross-sectional side elevation view of a portion of the fluid divider valve of FIG. 1, showing the actuator in the drive assembly;

DETAILED DESCRIPTION OF THE PREFERRED EMBODIMENTS

Figure 1:
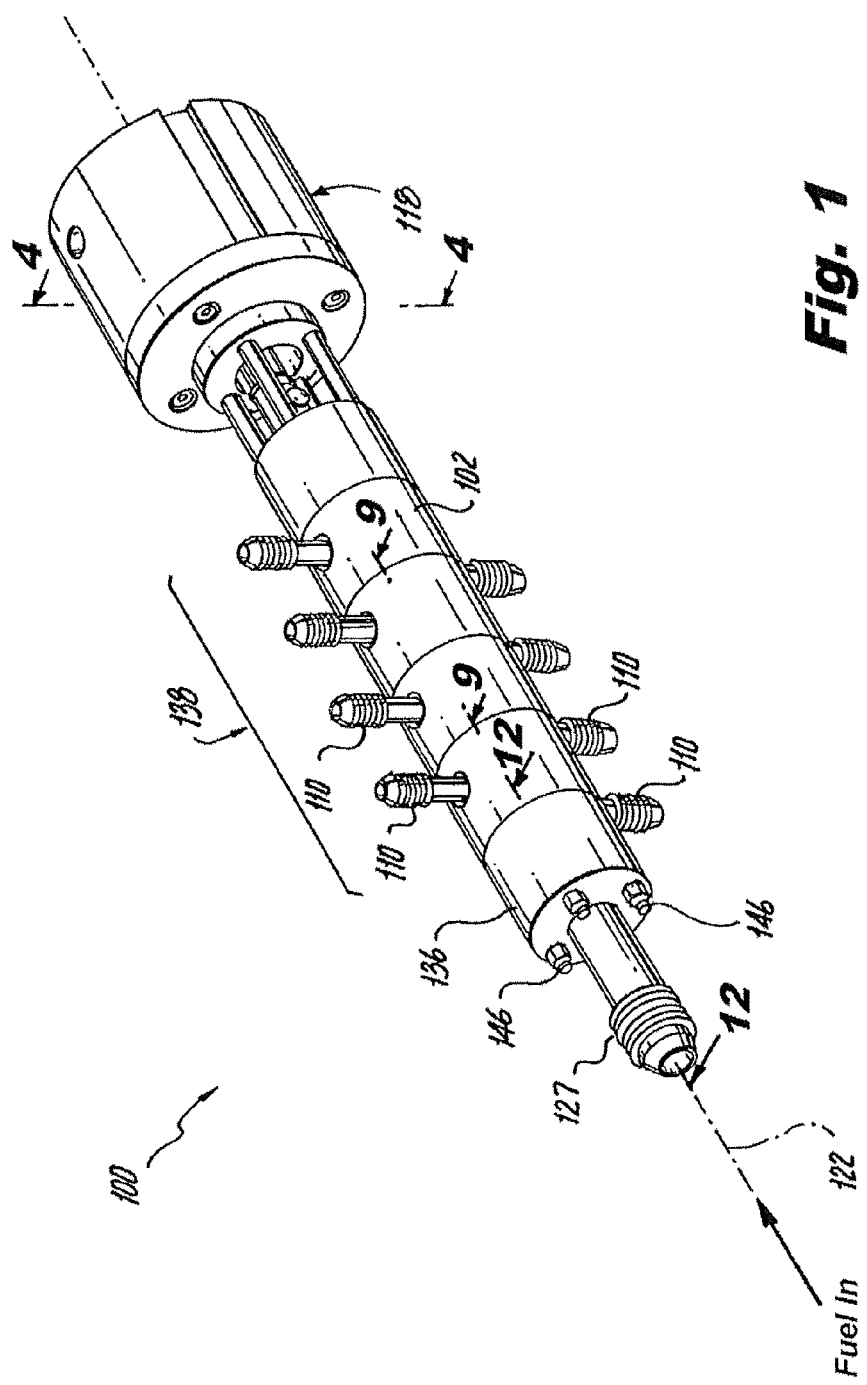
FIG. 1 is a perspective view of an exemplary embodiment of a fluid divider valve constructed in accordance with the present invention, showing the fluid inlet and outlets.

Reference will now be made to the drawings wherein like reference numerals identify similar structural features or aspects of the subject invention. For purposes of explanation and illustration, and not limitation, a partial view of an exemplary embodiment of a fluid divider valve constructed in accordance with the present invention is shown in FIG. 1 and is designated generally by reference character 100. Other embodiments of fluid divider valves in accordance with the invention, or aspects thereof, are provided in FIGS. 2-23, as will be described.

The systems and methods of the invention can be used to distribute liquid fuel in dual-fuel gas turbine engines when operating on liquid fuel, and to prevent cross talk when operating on gaseous fuel. The systems and methods of the invention can also be used in any other suitable application where it is desirable to simultaneously open and close multiple fluid ports in fluid communication with a common fluid source.

Figure 2:
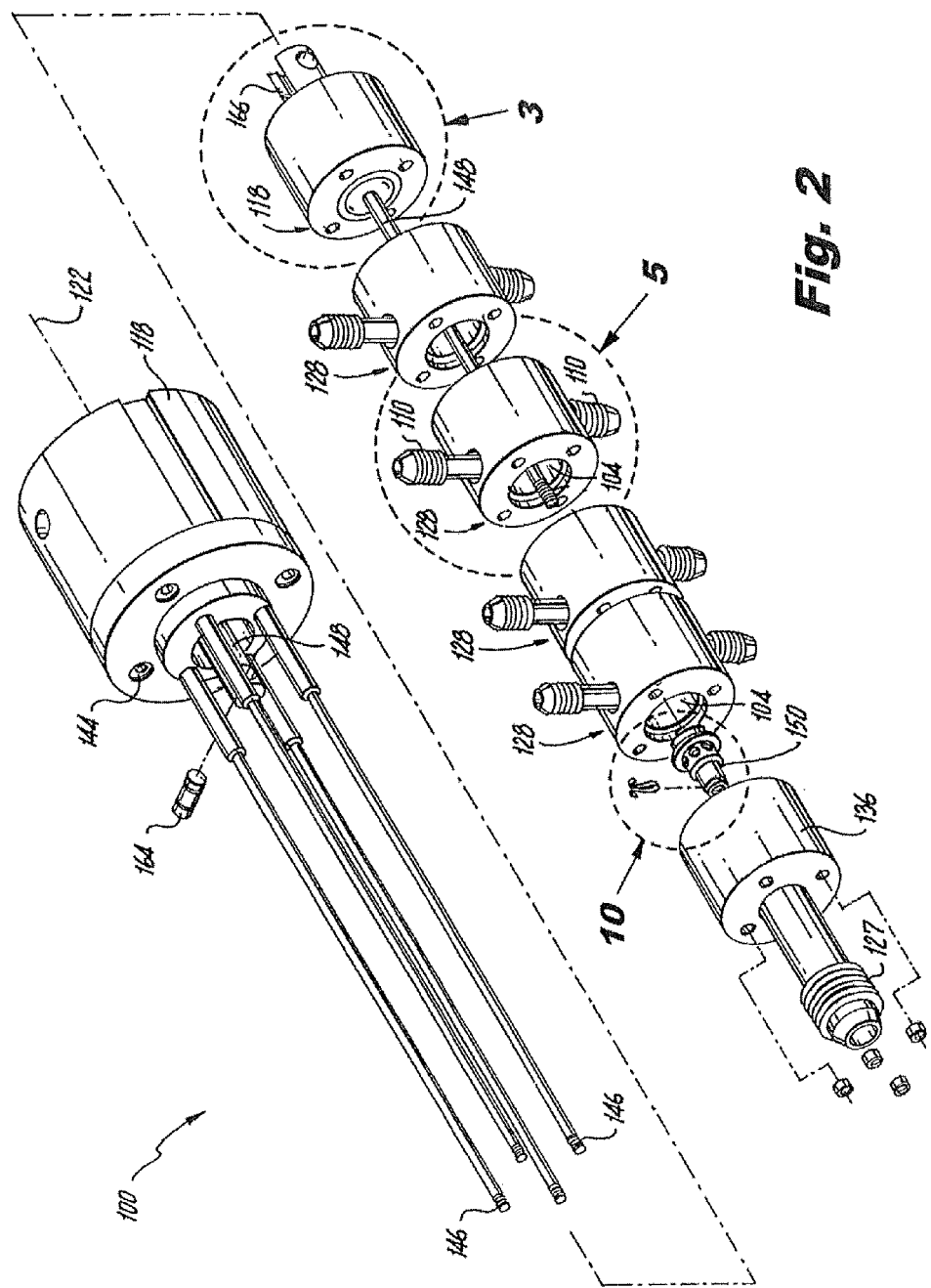
FIG. 2 is an exploded perspective view of the fluid divider valve of FIG. 1, showing the individual divider blocks.

Referring now to FIG. 1, fluid divider valve 100 is shown including a housing 102 defining an internal longitudinal bore 104 (see in FIG. 2). A fluid inlet 106 (see in FIG. 9) is in fluid communication with longitudinal bore 104 for receiving fluid from a source of pressurized fluid such as a fuel pump or liquid reservoir. An inlet fitting 136 is engaged and in fluid communication with inlet 106 of housing 102 to connect housing 102 to a source of pressurized fluid. An inlet assembly 136 forms a terminal portion of housing 102 and includes inlet 106 and inlet fitting 127. Housing 102 defines a plurality of outlets 108 (see in FIG. 9) in fluid communication with longitudinal bore 104 for distributing fluid from fluid inlet 106 to a plurality of fluid injectors. An outlet fitting 110 is connected to each outlet 108 to facilitate connection of conduits to divider valve 100, for example to connect housing 102 to supply lines of injectors external to housing 102. Each outlet fitting 110 includes a metering orifice 126 (see in FIG. 9). The purpose of the metering orifices 126 is to control the flow rate to each outlet, allowing for a calibrated flow rate to each port at a given pressure drop across divider valve 100.

Figure 5:
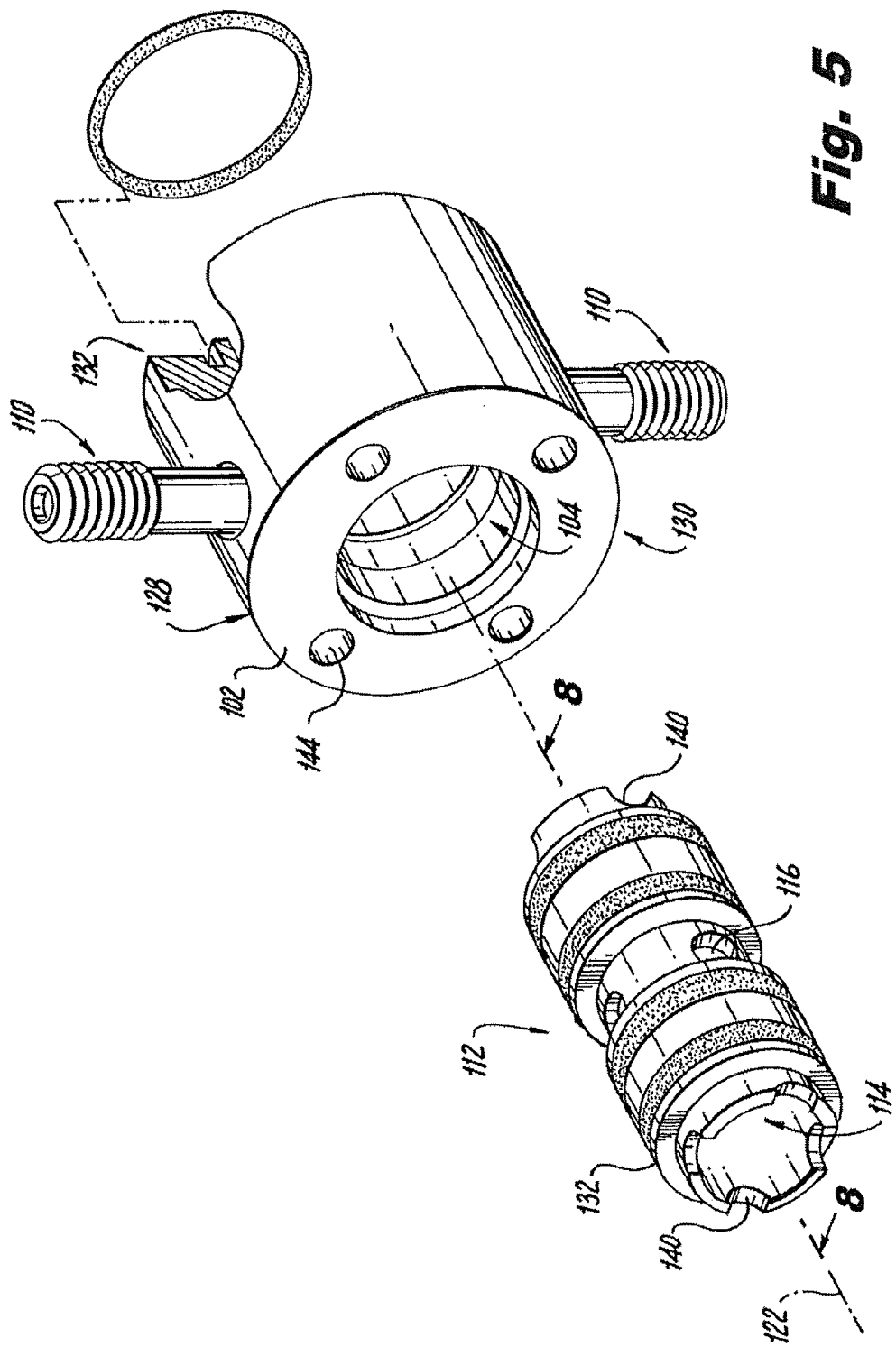
FIG. 5 is an exploded perspective view of a portion of the fluid divider valve of FIG. 1, showing one of the valve divider blocks and the corresponding valve shaft portion.

Referring now to FIG. 5, a portion of valve shaft 112 is shown. Valve shaft 112 is sealingly engaged within longitudinal bore 104 of housing 102 when assembled. Valve shaft 112 defines an internal longitudinal flow passage 114 (see also FIG. 8) extending therethrough in fluid communication with fluid inlet 106 of housing 102 (fluid inlet 106 is not shown in FIGS. 5 and 8, but is shown in FIG. 9). Valve shaft 112 has a plurality of radial fluid ports 116 formed therein extending from internal longitudinal flow passage 114 to an exterior portion of valve shaft 112. Valve shaft 112 is mounted for movement relative to housing 102 between a first position shown in FIG. 14 and a second position shown in FIG. 13. In the first position, valve shaft 112 permits fluid communication between fluid inlet 106 and outlets 108 through radial fluid ports 116 of valve shaft 112. In the second position, valve shaft 112 is positioned to prevent fluid communication between inlet 106 and outlets 108.

With reference now to FIGS. 3 and 4, fluid divider valve 100 further includes a drive assembly 118 engaged with housing 102. Drive assembly 118 has an actuator 120 (see FIG. 3) that is operably connected to valve shaft 112, as will be described in greater detail below. Actuator 120 is configured and adapted to move valve shaft 112 between the first and second positions described above linearly along a longitudinal axis 122 defined by longitudinal bore 104 of housing 102.

Referring now to FIG. 4, drive assembly 118 includes pneumatics to provide the linear motion of valve shaft 112, however, hydraulics or any other suitable type of mechanism can be used without departing from the spirit and scope of the invention. Drive assembly 118 includes an annular stop 171 which corresponds to stop 173 on actuator 120 for limiting the extent of motion of actuator 120. A self locking lip seal 175 seals the interior of drive assembly 118 from external contamination. Actuator 120 includes two additional seals 177 for preventing external leakage of fuel from drive assembly 118.

Figure 7:
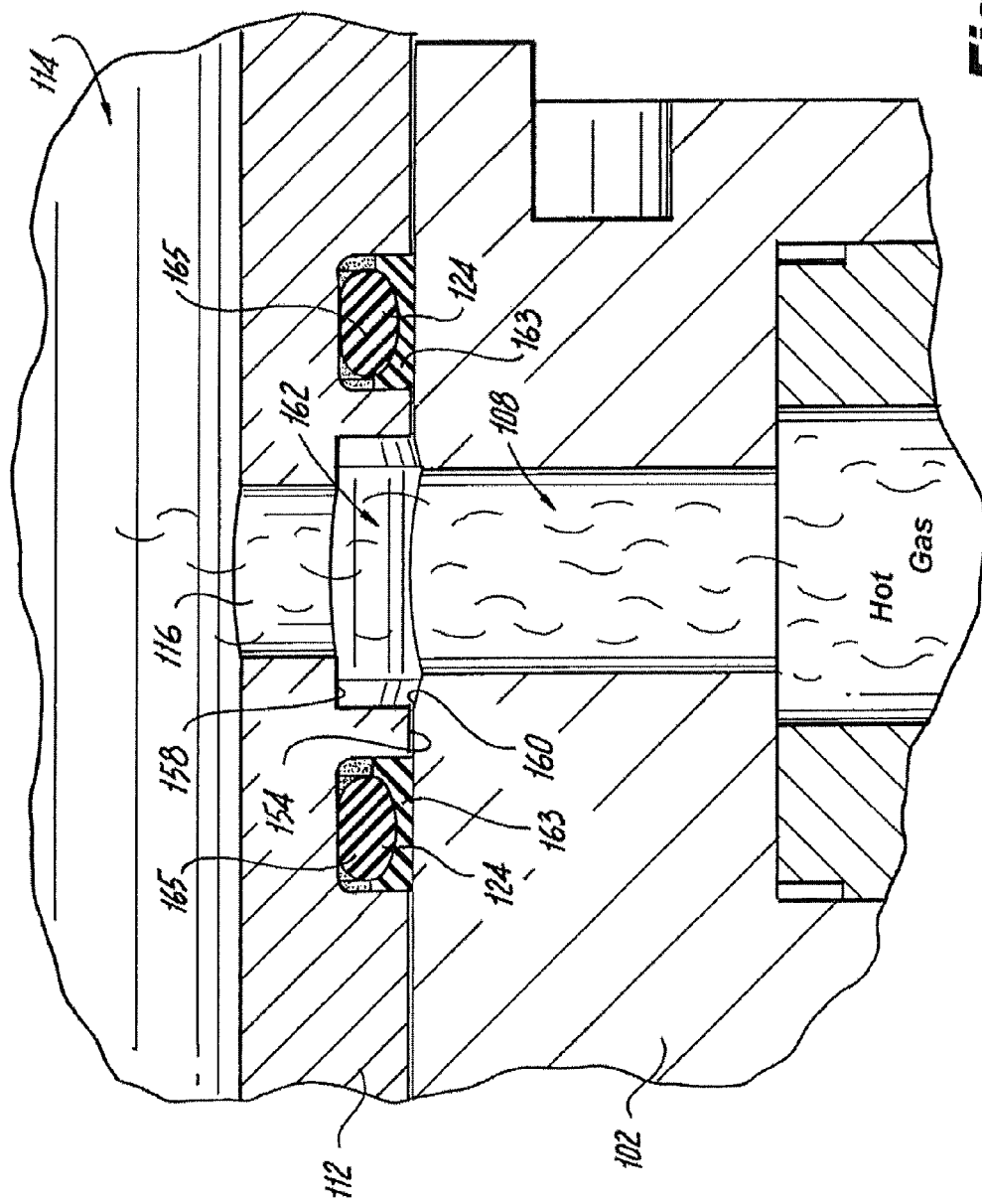
FIG. 7 is an enlarged cross-sectional side elevation view of the valve divider block of FIG. 6, showing the circumferential groove in the longitudinal bore of the housing.
Figure 8:
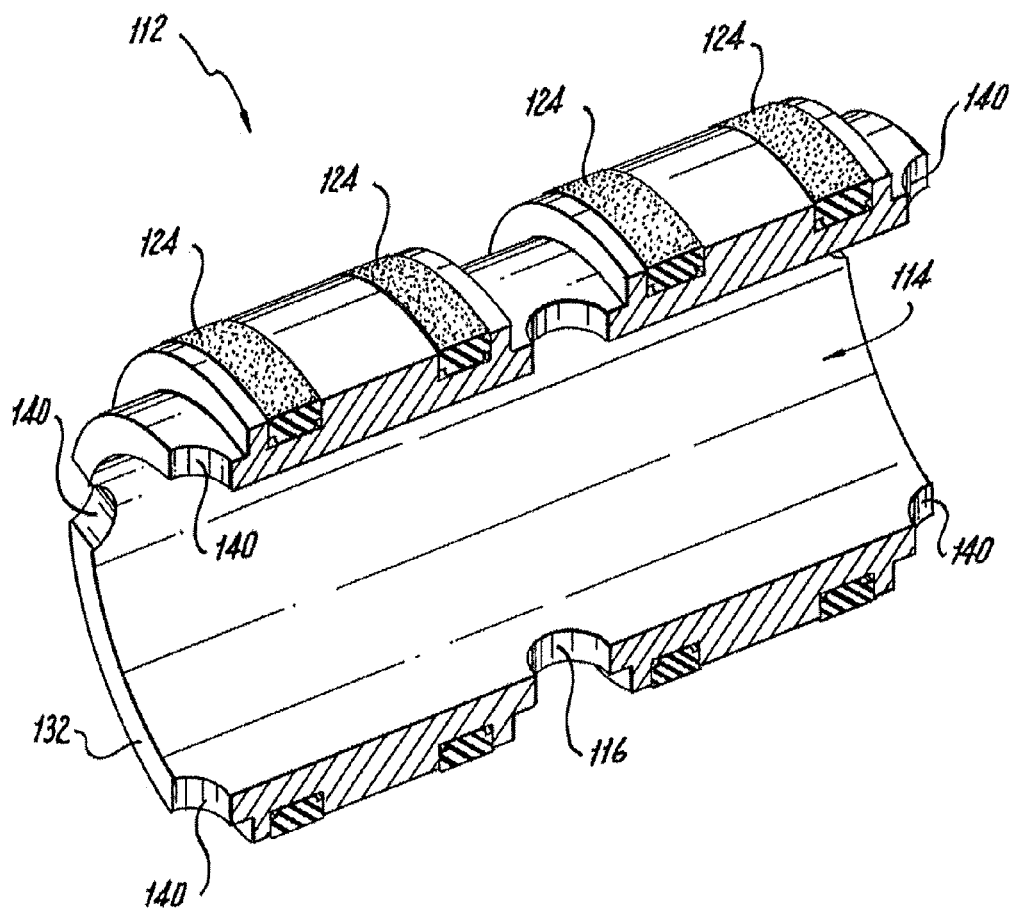
FIG. 8 is a cross-sectional perspective view of the valve shaft of FIG. 6, showing the arrangement of the seals.
Figure 9:
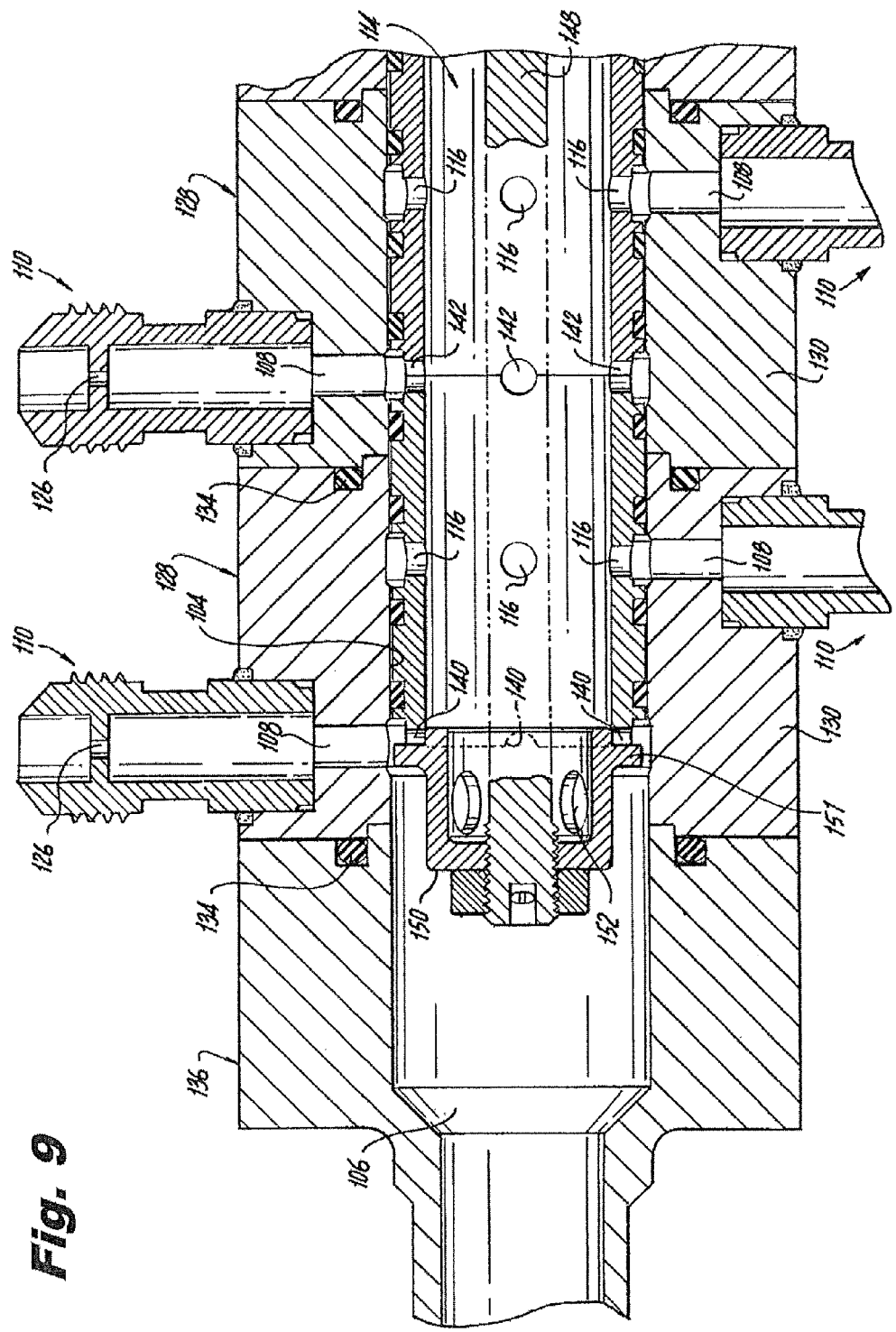
FIG. 9 is a cross-sectional side elevation view of two of the valve divider blocks of FIG. 5 assembled together, showing how the divider blocks and the respective valve shafts are engaged.

With reference now to FIG. 8, valve shaft 112 includes four seals 124, similar to seals 177 described above, each disposed around valve shaft 112 circumferentially. Seals 124 provide the sealing engagement between valve shaft 112 and longitudinal bore 104 of housing 102. Seals 124 are two piece assemblies. Each seal 124 includes an elastomeric o-ring 163, shown in FIG. 7, which functions as a radial spring element. Each seal 124 also has a polymer ring 165, also shown in FIG. 7, which is compressed between bore 104 and o-ring 163. Polymer ring 165 provides a fluid seal at the bore 104, and o-ring 163 provides a fluid seal against valve shaft 112. Suitable seals of this type include the CP Profile Seal, or Parker 0307CP0-019A, available from Parker Hannifin Corp of Cleveland, Ohio, for example. It is also possible to use an o-ring made of tetrafluoroethylene and propylene copolymer (TFE/P), for example, in place of a two-part seal such as seal 124. However, those skilled in the art will readily appreciate that any other suitable type of seal or seal material can be used.

FIG. 7 shows seals 124 in an enlarged view, which shows valve shaft 112 in the first position, with a radial port 116 positioned to allow flow through an outlet 108. A small gap 154 between valve shaft 112 and housing 102 is sealed by seals 124. When in the closed position (see e.g., FIG. 13), hot gas that would otherwise enter internal longitudinal flow passage 114 from outlets 108 is blocked by valve shaft 112 and seals 124. The portion of gap 154 in the flow path of back flowing gas from outlet 108 toward seals 124 is long and narrow enough to prevent excessive corrosion of seals 124 by the gasses when valve shaft 112 is in the closed position.

Figure 6:
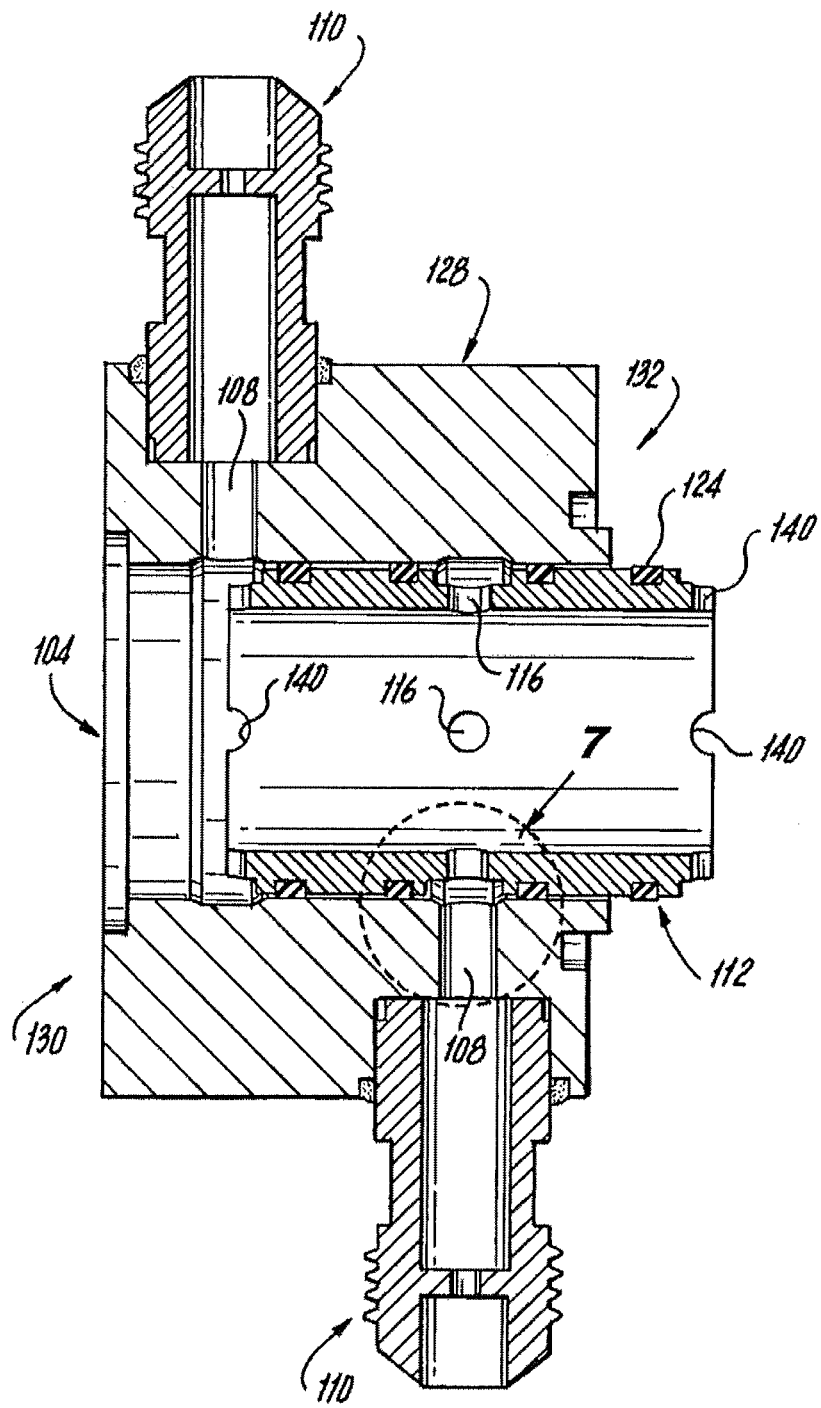
FIG. 6 is a cross-sectional side elevation view of the valve divider block of FIG. 5, showing the valve shaft and outlet fittings.

Referring now to FIG. 2, fluid divider valve 100 has eight outlets 108 and is modular, meaning it can be easily configured to have any suitable number of outlets for a given application. This modularity is accomplished by the use of interchangeable divider blocks 128. As shown in FIGS. 5 and 6, housing 102 and valve shaft 112 of fluid divider valve 100 include individual housing portions 130 and valve shaft portions 132, respectively, of four individual divider blocks 128. The individual units of divider blocks 128 are stacked or ganged together to form a divider block assembly 138, as shown in FIGS. 1 and 2. Those skilled in the art will appreciate that this modularity allows any suitable even number of outlets 108 be included. For example, if fourteen outlets are needed, seven divider blocks 128 can be ganged into divider block assembly 138.

Referring now to FIG. 9, two individual divider blocks 128 are shown connected together. Each divider block 128 includes a housing portion 130 which forms a portion of housing 102 when the respective divider block 128 is assembled into fluid divider valve 100. Housing portion 130 defines a portion of internal longitudinal bore 104 extending therethrough from a first end to a second end of divider block 128. Each divider block includes two outlets 108 in fluid communication with longitudinal bore 104. Housing portion 130 of each divider block 128 is configured and adapted to be connected end to end with housing portions 130 of adjacent divider blocks 128 to form divider block assembly 138, as indicated in FIGS. 1 and 9.

A face seal 134 disposed around the opening of the portion of longitudinal bore 104 in the first end of housing portion 130 of each divider block 128 forms a sealing engagement with the second end of an adjacent divider block 128. If the divider block 128 is at an end of divider block assembly 138, its face seal 134 can sealingly engage a terminal component of fluid divider valve 100, such as inlet assembly 136. Face seals 134 prevent external leakage from the assembly of divider blocks 128, inlet assembly 136, drive assembly 118, and the respective ends of the assembly of divider blocks 128. Face seals 134 are elastomeric, however those skilled in the art will readily appreciate that metal to metal seals, or any suitable seal under axial compression can also be used.

With reference now to FIGS. 8-9, each divider block 128 includes a valve shaft portion 132 of valve shaft 112 sealingly engaged within the portion of longitudinal bore 104 of the respective divider block 128. Each valve shaft portion 132 defines a portion of internal longitudinal flow passage 114 extending therethrough. Each valve shaft portion 132 has four radial fluid ports 116 formed therein extending from internal longitudinal flow passage 114 to an exterior portion of valve shaft 112. Those skilled in the art will appreciate that any suitable number of fluid ports 116 can also be used without departing from the scope of the invention. The number and size of ports can be determined to provide an acceptably low pressure drop at maximum flow conditions.

Each divider block 128 can include two outlets 108 defined in its housing portion 130. Each valve shaft portion 132 includes four radial ports 116 proximate a first one of the two outlets 108 of divider block 128, which is the lower outlet 108 of each divider block 128 as oriented in FIG. 9. As can be seen in FIG. 8, shaft portions 132 are symmetrical in the axial direction.

Each valve shaft portion 132 also includes four partial radial ports 140 defined in each end thereof. Each partial radial port 140 forms a complete radial port 142 with the end of an adjacent valve shaft portion 132. Each partial radial port 140 of each conjoined valve shaft portion 132 is dimensioned so that when aligned with an opposed partial radial port 140, the complete radial ports 142 are substantially the same size as radial ports 116. While partial radial ports 140 are shown aligned to form radial ports 142, such alignment is not necessary as long as ports 140 provide the proper flow area to achieve the desired pressure drop from the inside to the outside of valve shaft 112 at maximum flow rate. When assembled, as shown in FIG. 9, each complete radial port 142 is formed proximate a second outlet 108 in the respective housing portion 130, one of which is shown proximate the respective upper outlet 108 as oriented in FIG. 9.

With continued reference to FIG. 9, end cap 150 does not have partial radial ports to correspond to the partial radial ports 140 of the adjacent segment of valve shaft 112, which are blocked by end cap 150. In order to provide flow to the adjacent outlet 108 that is consistent with the flow to the other outlets 108, the diameter of flange 151 of end cap 150 is dimensioned such that the annulus formed between flange 151 and bore 104 provides the same controlling flow area as four radial ports 142.

FIGS. 8 and 9 show valve shaft portions 132 in cross-section, so not all of the four radial ports 116, 142 are shown for each outlet 108. Those skilled in the art will readily appreciate that any suitable number of radial ports can be used without departing from the spirit and scope of the invention. The number of radial ports and the dimensions of the radial ports can be varied for specific applications to provide an acceptable pressure drop from one outlet to the next. Those skilled in the art will appreciate that pressure drop control can be accomplished primarily at outlet orifices 126, as described above.

Referring now to FIG. 7, a circumferential recess 158 is formed on the outer surface of valve shaft 112 adjacent to radial ports 116 (similar recesses are formed adjacent partial radial ports 140, as shown in FIG. 8). A circumferential channel 160 is formed in longitudinal bore 104 at each outlet 108. As shown in FIG. 7, with valve shaft 112 in the open flow position, recess 158 and channel 160 combine to form annular chamber 162. Fluid from internal longitudinal flow passage 114 can pass through each of the radial ports 116, 142, which are shown in FIG. 9, adjacent outlets 108. This fluid exiting the radial ports 116, 142 floods annular chamber 162 and exits the respective outlet 108.

In this manner, each radial port 116, 142 is utilized to feed its respective outlet 108, and thereby pressure drop is reduced for each outlet 108 compared to the pressure drop that could result if only one radial port were provided for each outlet 108. Channels 160 prevent seals 124 from having to cross outlets 108, where it is possible for a seal to catch on an edge formed by an outlet 108 and bore 104. It is also possible to use a purely cylindrical bore without channels 160, in which case to mitigate the possibility of a seal catching on an edge formed by an outlet and the bore, a process like extrude honing, electro polishing, or any other suitable process can be used to form a smooth edge radius.

With each radial port 116, 142 feeding into an annular chamber 162, it is not necessary to align any of the radial ports 116, 142 circumferentially with its respective outlet 108. Each outlet 108 will draw fluid from its respective annular chamber 162 regardless of the rotational orientation of the respective radial ports 116, 142 feeding into the respective annular chamber 162.

Figure 13:
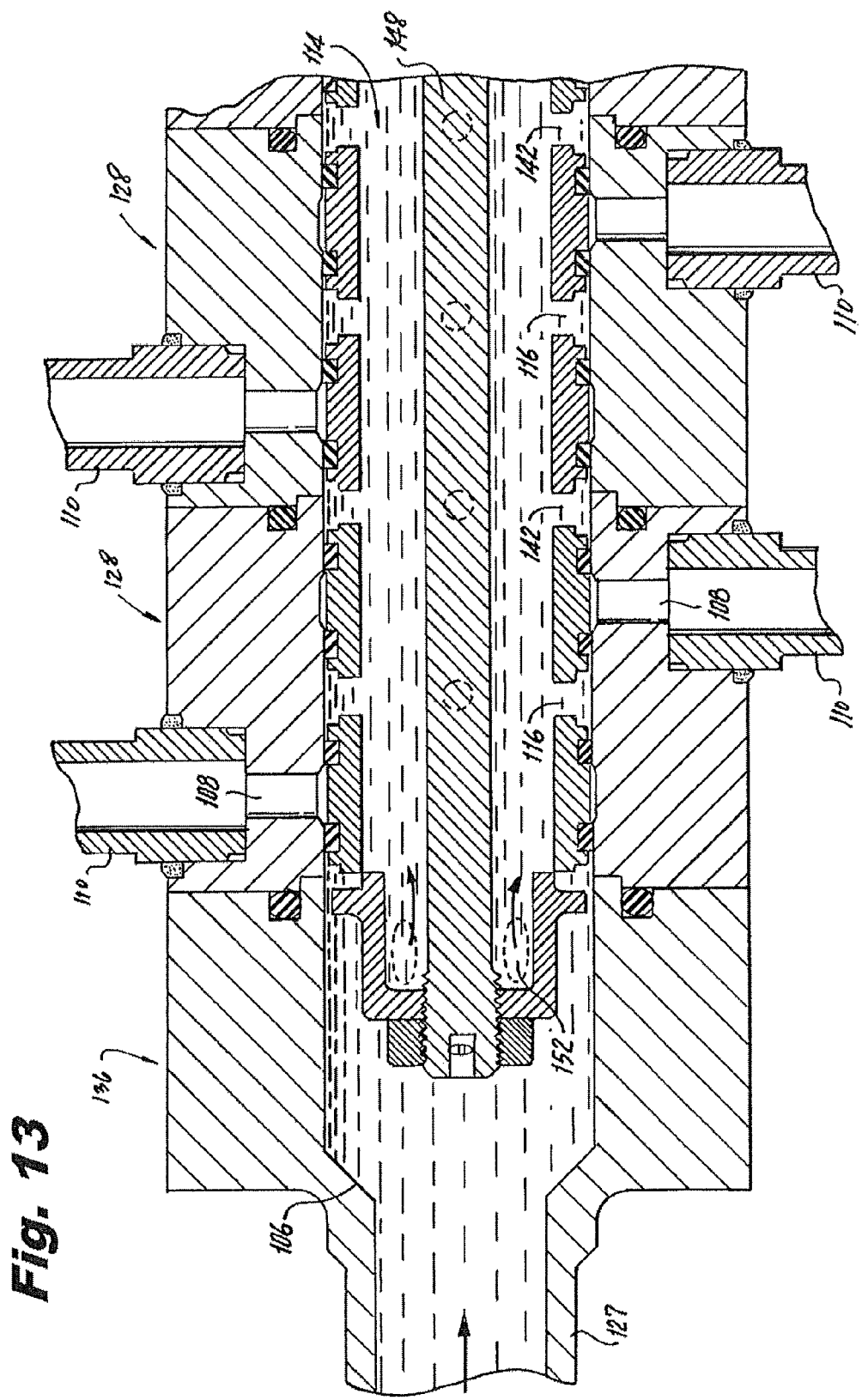
FIG. 13 is a cross-sectional side elevation view of the fluid divider valve of FIG. 9, showing fluid introduced at the inlet into the interior of the fluid divider valve with the outlets blocked by the valve shafts.

FIG. 9 shows two assembled valve shaft portions 132 in the first position in which the assembled valve shaft 112 permits fluid communication along a flow path from internal longitudinal fluid passage 114 through radial fluid ports 116, 142 and out through outlets 108 of housing 102. FIG. 13 shows the second position in which valve shaft 112 prevents fluid communication along the flow path.

FIGS. 5-6 show a divider block 128 with housing portion 130 and valve shaft portion 132. Housing portion 130 includes four assembly bores 144 formed therethrough substantially parallel to longitudinal bore 104. Assembly bores 144 are configured to receive a tie rod, or through bolt 146, therethrough for fastening a plurality of divider blocks 128 end to end, as shown in FIG. 2. Inlet fitting 136 and drive assembly 118 also include four corresponding assembly bores so that through bolts 146 serve to join the components of fluid divider valve 100 together as shown in FIG. 1.

Figure 12:
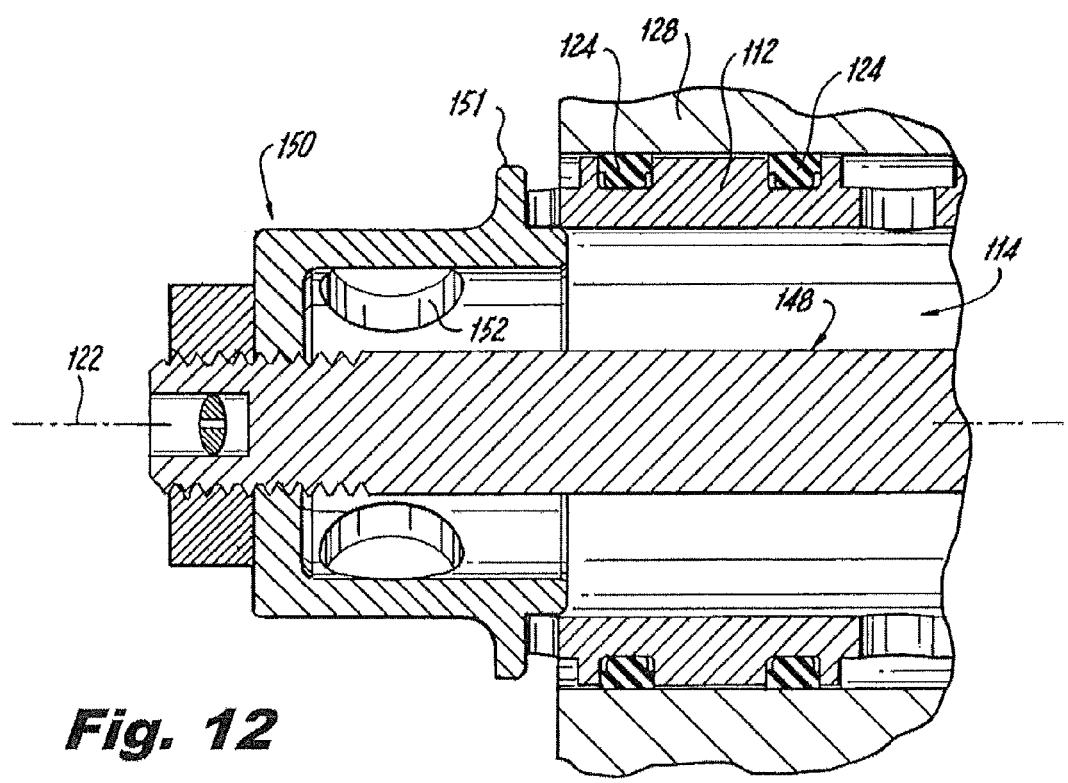
FIG. 12 is a cross-sectional side elevation view of a portion of the fluid divider valve of FIG. 1, showing the inlet end of the valve shaft assembly.

Referring now to FIGS. 3 and 12, valve shaft portions 132 of the assembled divider blocks 128 connect end to end with each other to transfer forces along each valve shaft portion 132 to move the connected valve shaft portions 132 between the first and second positions as a single unit, namely valve shaft 112. To this end, the assembly of fluid divider valve 100 further includes a tension rod 148 having a first end operably coupled to the actuator 120 of the drive assembly 118, as shown in FIG. 3, and a second end operably coupled to valve shaft 112. Actuator 120 includes a clevis 166 and the end of tension rod 148 is connected in clevis 166 by clevis pin 164, as shown in FIG. 4, however those skilled in the art will appreciate that any suitable type of connection can be used without departing from the scope of the invention. Tension rod 148 runs through the internal longitudinal flow passage 114 of valve shaft 112 and is in tension thereby compressing the valve shaft portions 132 together end to end such that the valve shaft portions can move together between the first and second positions in a linear direction along axis 122 defined by tension rod 148.

Figure 10:
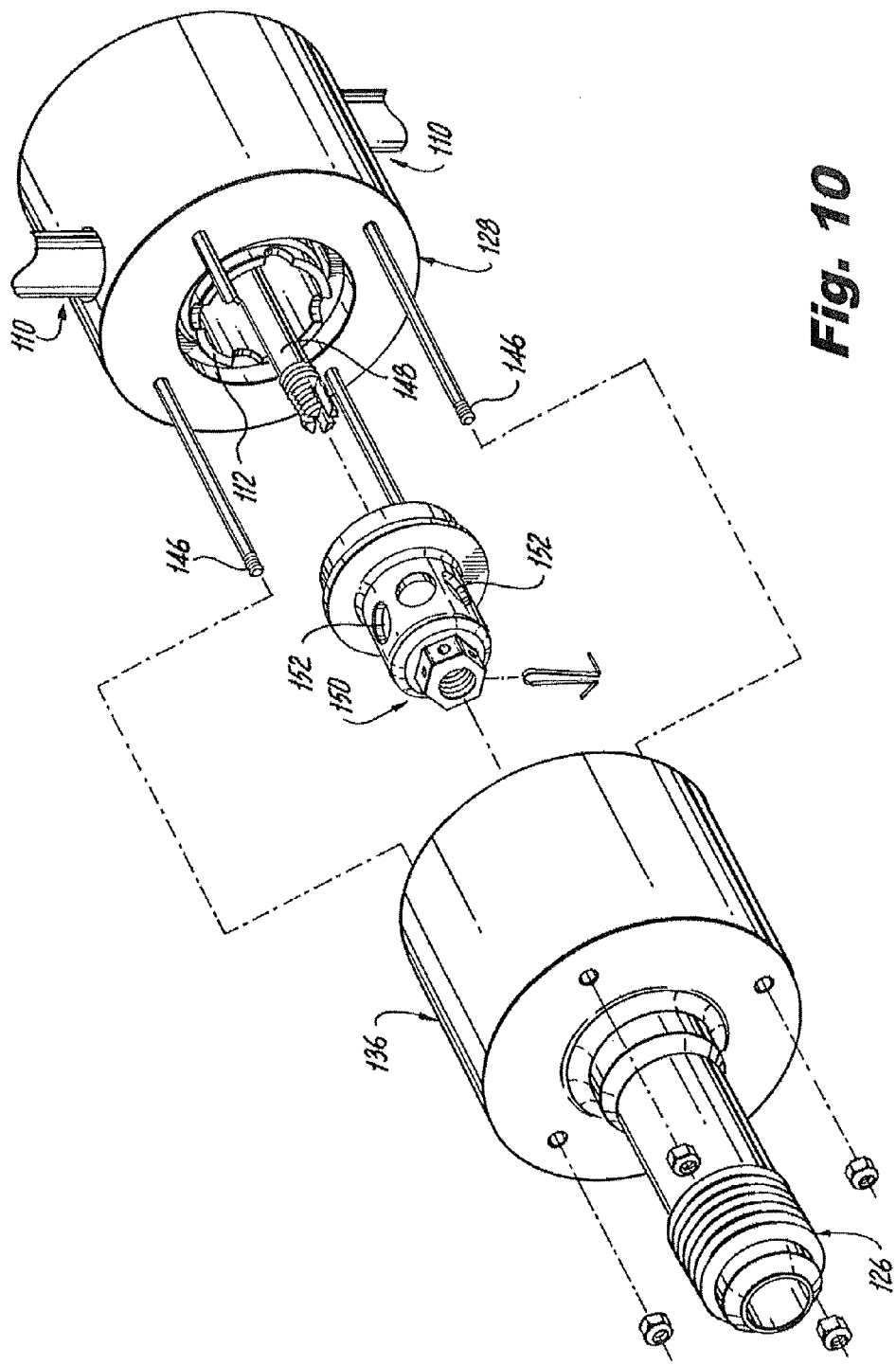
FIG. 10 is an exploded perspective view of a portion of the fluid divider valve of FIG. 1, showing the fastening elements of the tension rod and valve shafts.
Figure 11:
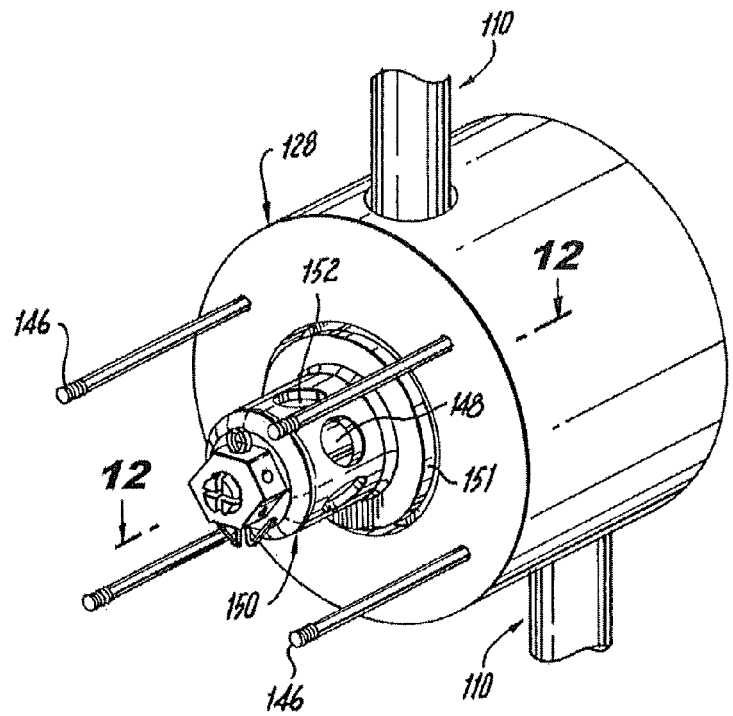
FIG. 11 is a perspective view of a portion of the fluid divider block of FIG. 1, showing the inlet assembly removed to show the assembled fastening elements of the tension rod and valve shafts.

As shown in FIGS. 10-12, an end cap 150 connects the second end of tension rod 148 to an end of valve shaft 112 by use of a threaded nut and cotter pin. In FIG. 10, the end of tension rod 148 has a cross-shaped slot in the threaded end for admitting the cotter pin, however it is also contemplated that tension rod 148 can have a cross drilling and a slotted or "castle" nut can be used with a cotter pin to provide the compressive force on tension rod 148. Those skilled in the art will readily appreciate that any other suitable attachment of end cap 150 can be used without departing from the spirit and scope of the invention. End cap 150 defines four fluid ports 152 therethrough, only some of which are shown in FIG. 12 due to the cross-section shown. Fluid ports 152 provide fluid communication from the interior of inlet assembly 136 to internal longitudinal flow passage 114. Those skilled in the art will readily appreciate that any suitable number of fluid ports 152 in an end cap and dimensions thereof can be used for any particular application without departing from the spirit and scope of the invention.

As described above, the annulus formed between flange 151 of end cap 150 and the inner surface of bore 104 is dimensioned to provide symmetrical pressure drop conditions for the first adjacent outlet 108 of housing 102, which is important since the first outlet 108 does not have an identical outlet 108 on each neighboring side. The outlet 108 closest to drive assembly 118 is fed by the respective radial ports 116 and is not significantly influenced by the end conditions of valve shaft 112.

Figure 14:
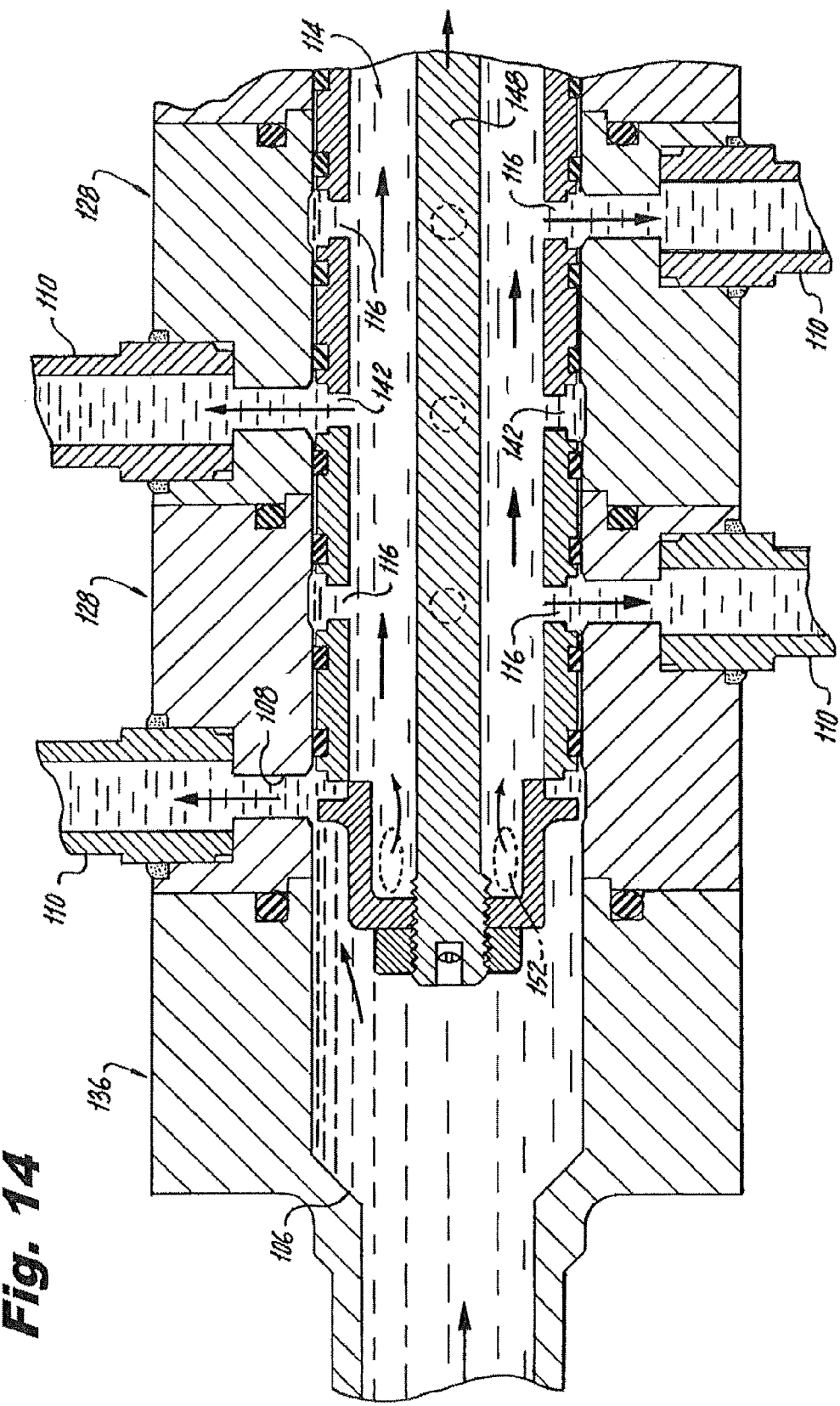
FIG. 14 is a cross-sectional side elevation view of the fluid divider valve of FIG. 13, showing fluid flowing from the inlet through the interior of the fluid divider valve and out the outlets through the radial ports in the valve shafts.

FIG. 13 shows valve shaft 112 in the closed position with internal longitudinal flow passage 114 and inlet fitting 127 each filled with fluid. Since outlets 108 are closed off by valve shaft 112, there is no fluid from inlet 106 flowing in outlets 108 or outlet fittings 110, and seals 124 prevent corrosive gasses from back flowing through outlets 108 into internal longitudinal flow passage 114. FIG. 14 shows valve shaft 112 in the opened position with fluid from inlet 106 flowing from internal longitudinal flow passage 114 to outlets 108 and out through outlet fittings 110.

Figure 15:
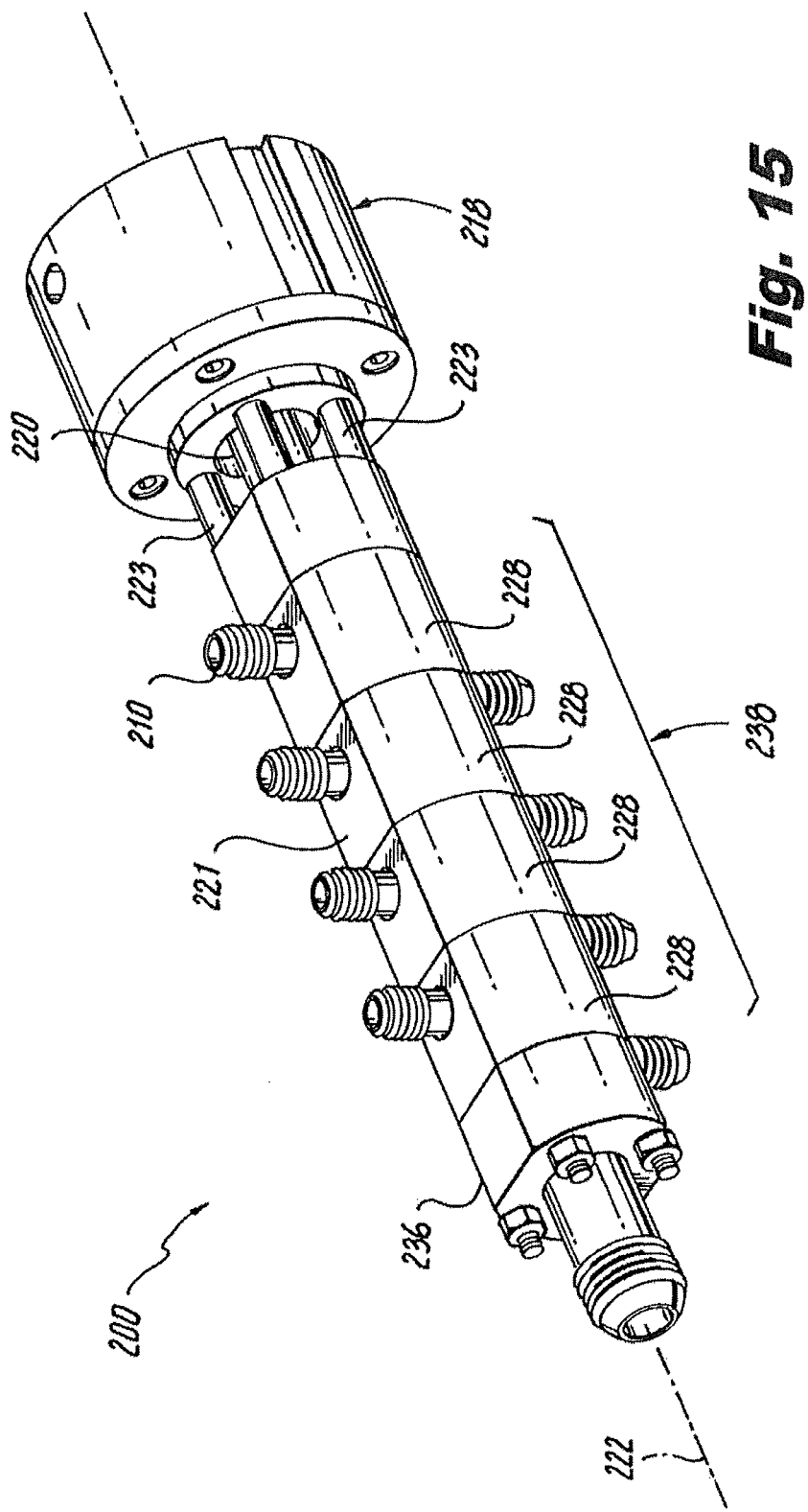
FIG. 15 is a perspective view of another exemplary embodiment of a fluid divider valve constructed in accordance with the present invention, showing the fluid inlet and outlets.

Referring now to FIGS. 15-18, another exemplary embodiment of a fluid divider valve 200 is shown. As shown in FIG. 15, fluid divider valve 200 includes an inlet assembly 236, a divider block assembly 238, and driver assembly 218 much as described above with respect to fluid divider valve 100. Linear motion along axis 222 opens and closes a flow path through outlet fittings 210 much as described above. One external feature that differs is flats 221 provided on the sides of driver assembly 238, inlet assembly 236, and a portion of drive assembly 218. Drive assembly 218 includes four spacers 223 to provide access to actuator 220. Spacers 223 provide an access to adjust the axial position of the clevis and actuator, which is required to establish the closed position of valve 200. The open position is controlled by the internal stop in the drive assembly (not shown, but see, e.g. stops 173 and 171 in FIG. 4).

Figure 16:
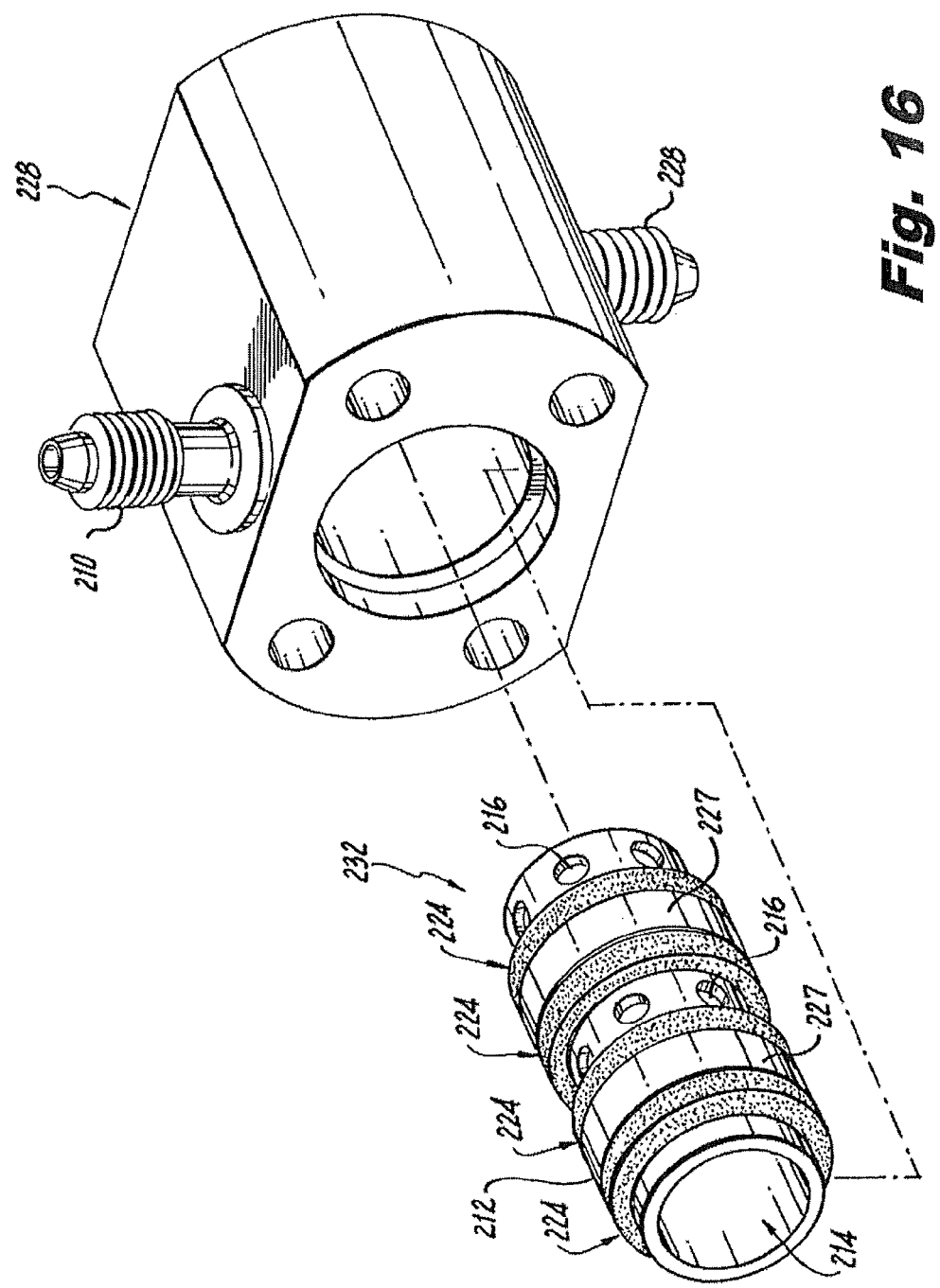
FIG. 16 is an exploded perspective view of a portion of the fluid divider valve of FIG. 15, showing a divider block and corresponding valve shaft portion.
Figure 17:
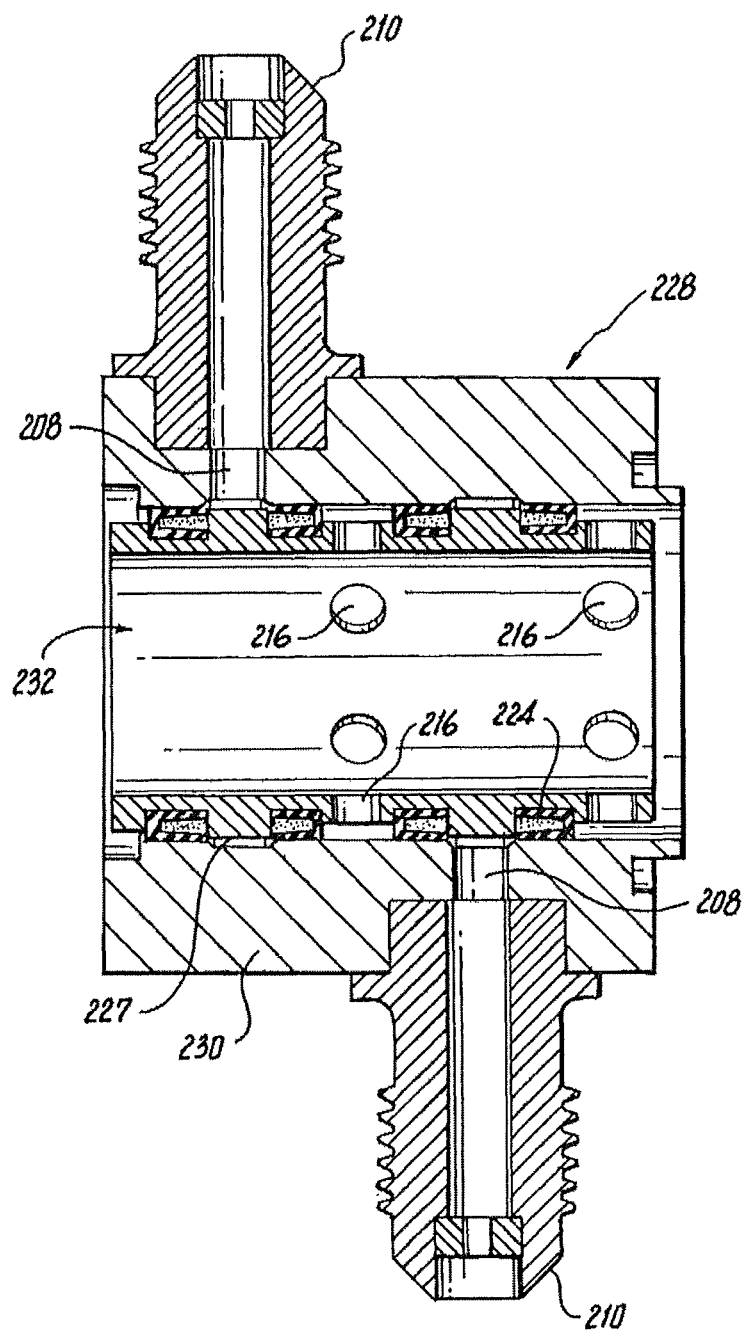
FIG. 17 is a cross-sectional side elevation view of a portion of the fluid divider valve of FIG. 15, showing one divider block in the closed position.
Figure 18:
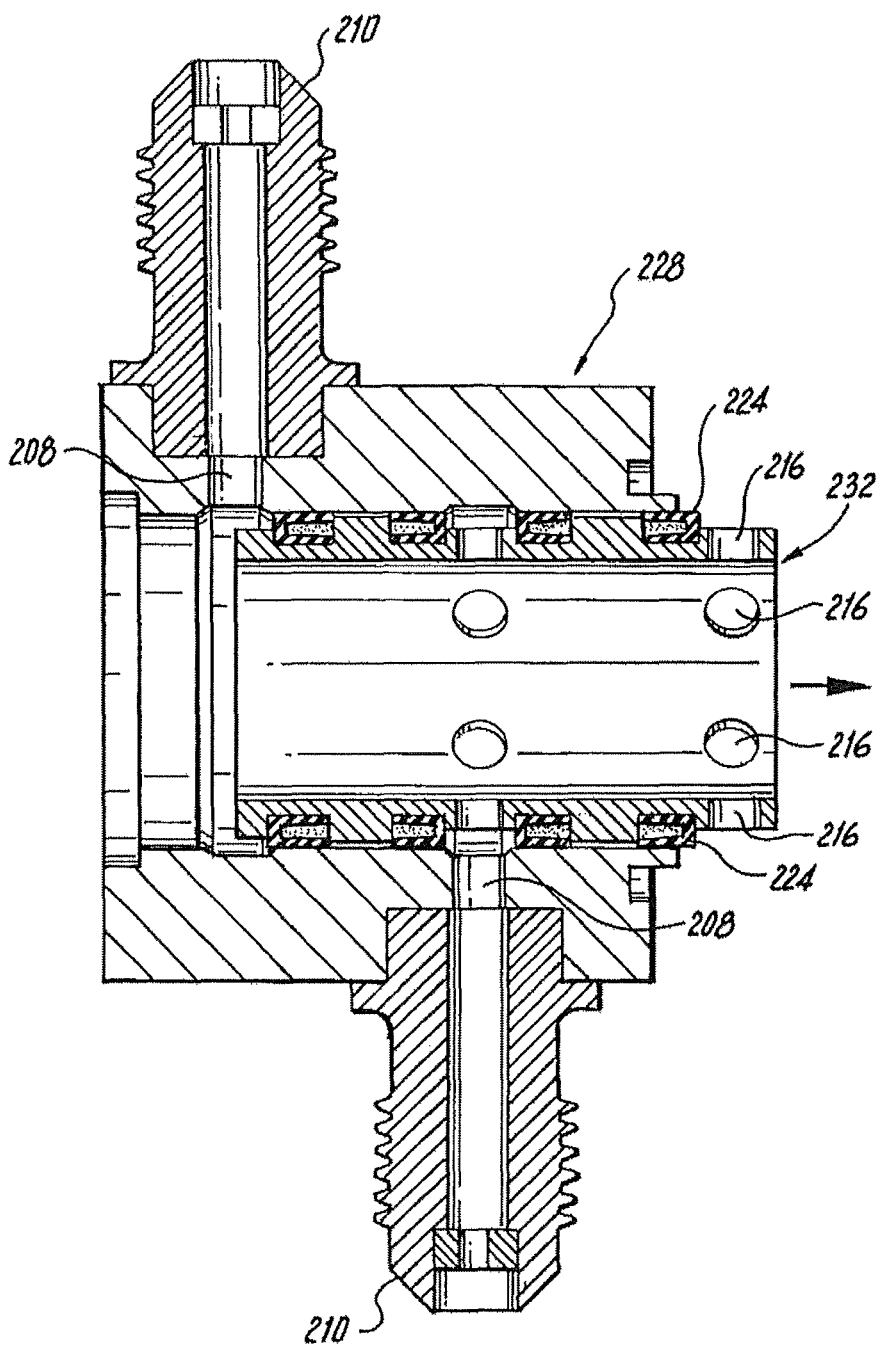
FIG. 18 is a cross-sectional side elevation view of the divider block of FIG. 17, showing the divider block in the opened position.

There are also internal features of fluid divider valve 200 that differ from fluid divider valve 100. As shown in FIGS. 16-18, valve shaft 212 (only one portion of which is shown) includes two sets of six radial ports 216 from internal longitudinal flow passage 214 to an exterior portion of valve shaft 212, one set for each outlet 208 of each divider block 228. As described above, the specific number of ports is not crucial, but rather it is the total flow area of the ports that is important. Seals 224 are self-energizing since they have a c-shaped cross-sectional profile. The c-shape opens towards the adjacent radial ports 216 so that the greater the pressure at ports 216, the greater the sealing force generated to prevent passage of fluids from radial ports 216 to outlets 208 when valve shaft 212 is in the closed position. Additionally, FIGS. 17-18 show the relative alignment of valve shaft portion 232 within housing portion 230 of divider block 228 in the closed and opened positions, respectively. The two seals 224 in the middle of valve shaft portion 232 are assembled onto valve shaft 212 over lands 227, as shown in FIG. 16.

Another exemplary embodiment of a flow divider valve 300 is shown in FIGS. 19-23. Like fluid divider valves 100 and 200, fluid divider valve 300 includes an inlet assembly 336, a divider block assembly 338, and a drive assembly 318. However, unlike divider valves 100 and 200, fluid divider valve 300 operates on rotary actuator motion, such as in a rotary pneumatic actuator, rather than on linear actuator motion, to open and close the flow paths.

Referring now to FIGS. 20-23, a single divider block 328 of divider block assembly 338 is shown, including valve shaft portion 332. Each of the valve shaft portions 332 includes drive tangs 333 on a first end thereof and corresponding drive slots 335 on a second end thereof. Drive tangs 333 are configured to mesh with drive slots 335 of an adjacent valve shaft portion 332 to provide rotational engagement of the valve shafts 332 with one another so that all of the valve shaft portions 332 can be rotated as a unitary valve shaft about an axis 322 defined by the internal longitudinal flow passage 314. There is no tension rod required for holding valve shafts 332 together, as the longitudinal bore of the housing of fluid divider valve 300 is dimensioned to hold the assembled valve shafts 332 in position in the axial direction.

Figure 20:
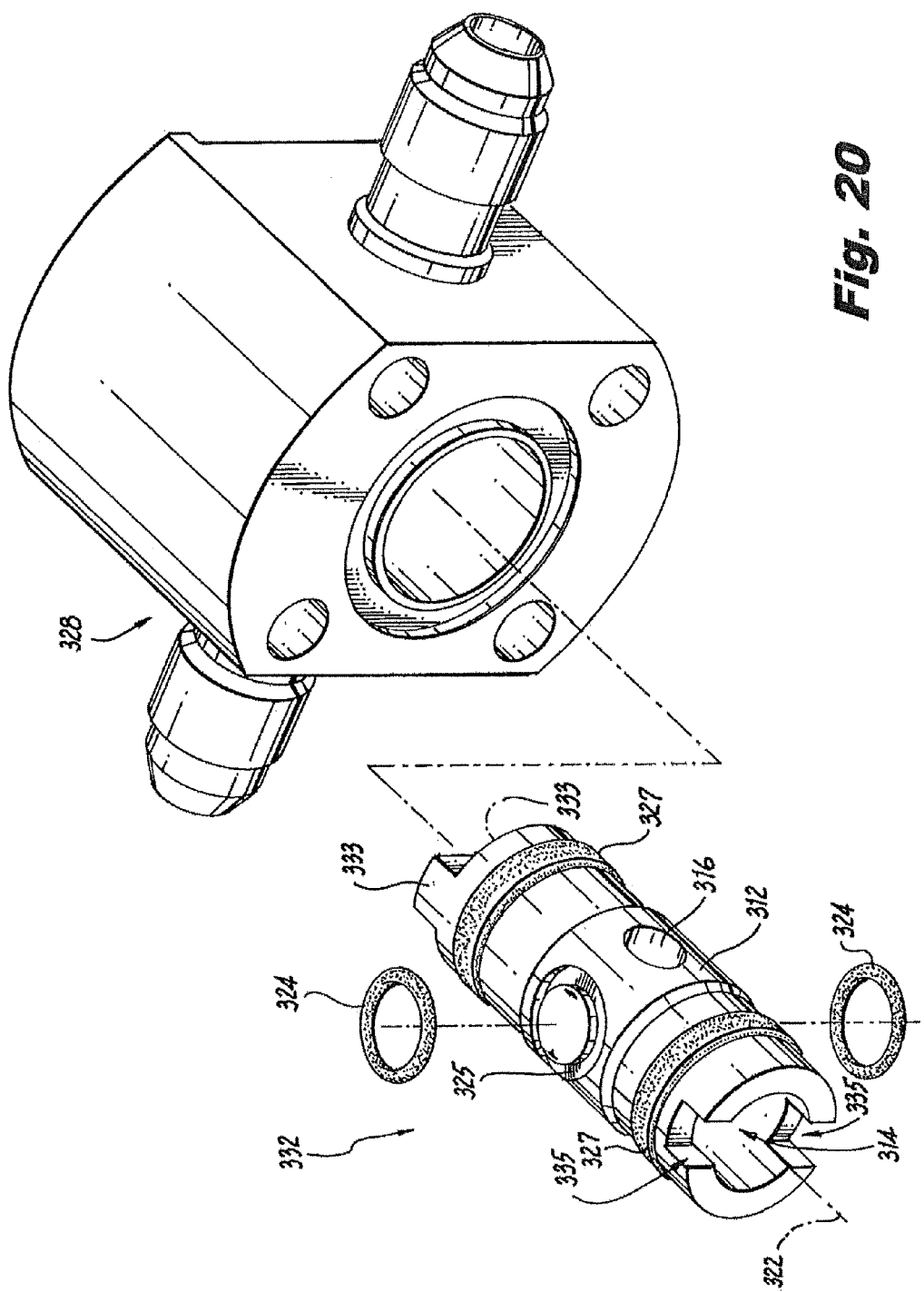
FIG. 20 is an exploded perspective view of a portion of the fluid divider valve of FIG. 19, showing a valve shaft portion with radial port, drive tangs, drive slots, and the recess for a seal.
Figure 21:
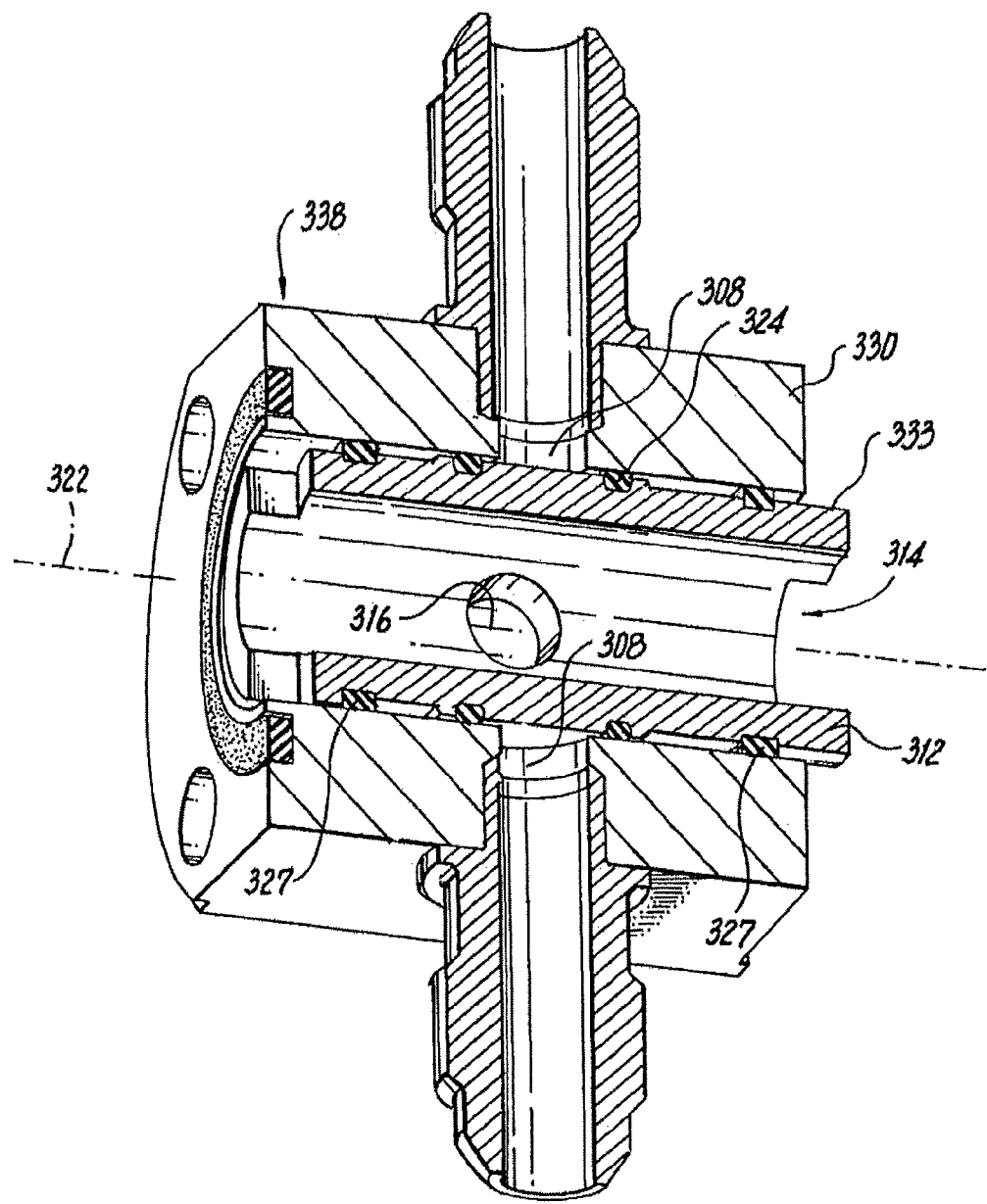
FIG. 21 is a cross-sectional perspective view of a portion of the fluid divider valve of FIG. 19, showing one divider block in the closed position.

As shown in FIGS. 20-21, each valve shaft portion 332 includes a seal 324 disposed thereon about 90° circumferentially spaced apart from each radial fluid port 316 for providing sealing engagement between the valve shaft and the longitudinal bore of the respective housing portion 330. While 90° spacing between seals 324 and their respective radial ports 316 provides even spacing, any other suitable angle can be used without departing from the spirit and scope of the invention.

Figure 22:
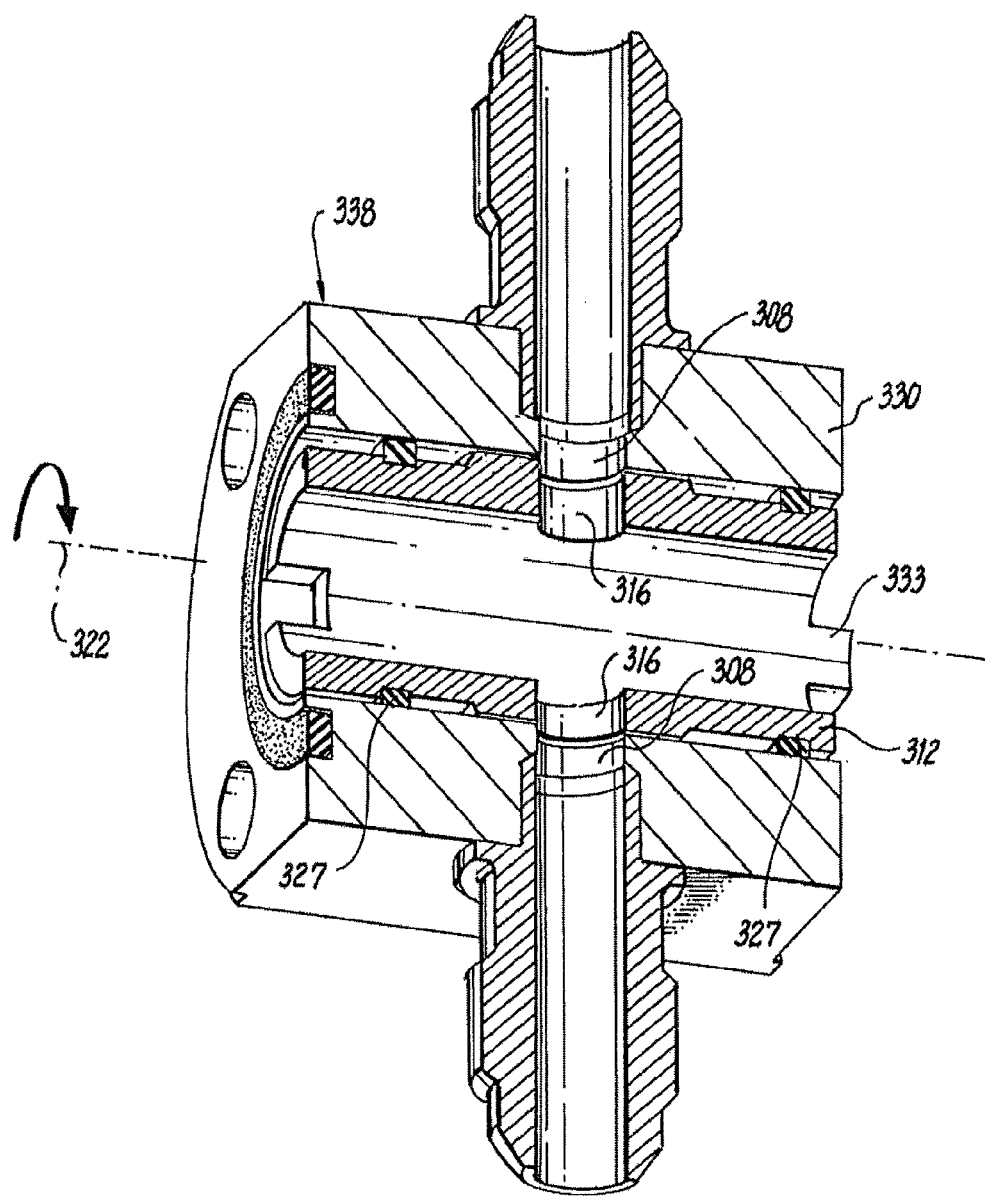
FIG. 22 is a cross-sectional perspective view of the divider block of FIG. 21, showing the divider block with the valve shaft portion rotated to the opened position.

Referring to FIG. 20, valve shaft portion 332 is shown with seal 324 removed to show the face type o-ring gland 325 where seal 324 is positioned when assembled. As shown in FIG. 21, when valve shaft 312 is in the closed position, a seal 324 surrounds and seals off each outlet 308 to close fluid divider valve 300. FIG. 22 shows valve shaft 212 rotated 90° to the open position, in which seals 324 are rotated away from outlets 308, and in their place, radial ports 316 are aligned with outlets 308 to allow flow of fluids therethrough. Circumferential support bushings 327 facilitate the rotation of valve shaft 312, and can be made of polytetrafluoroethylene (PTFE) or any other suitable material for supporting rotational movement of valve shaft 312.

Figure 19:
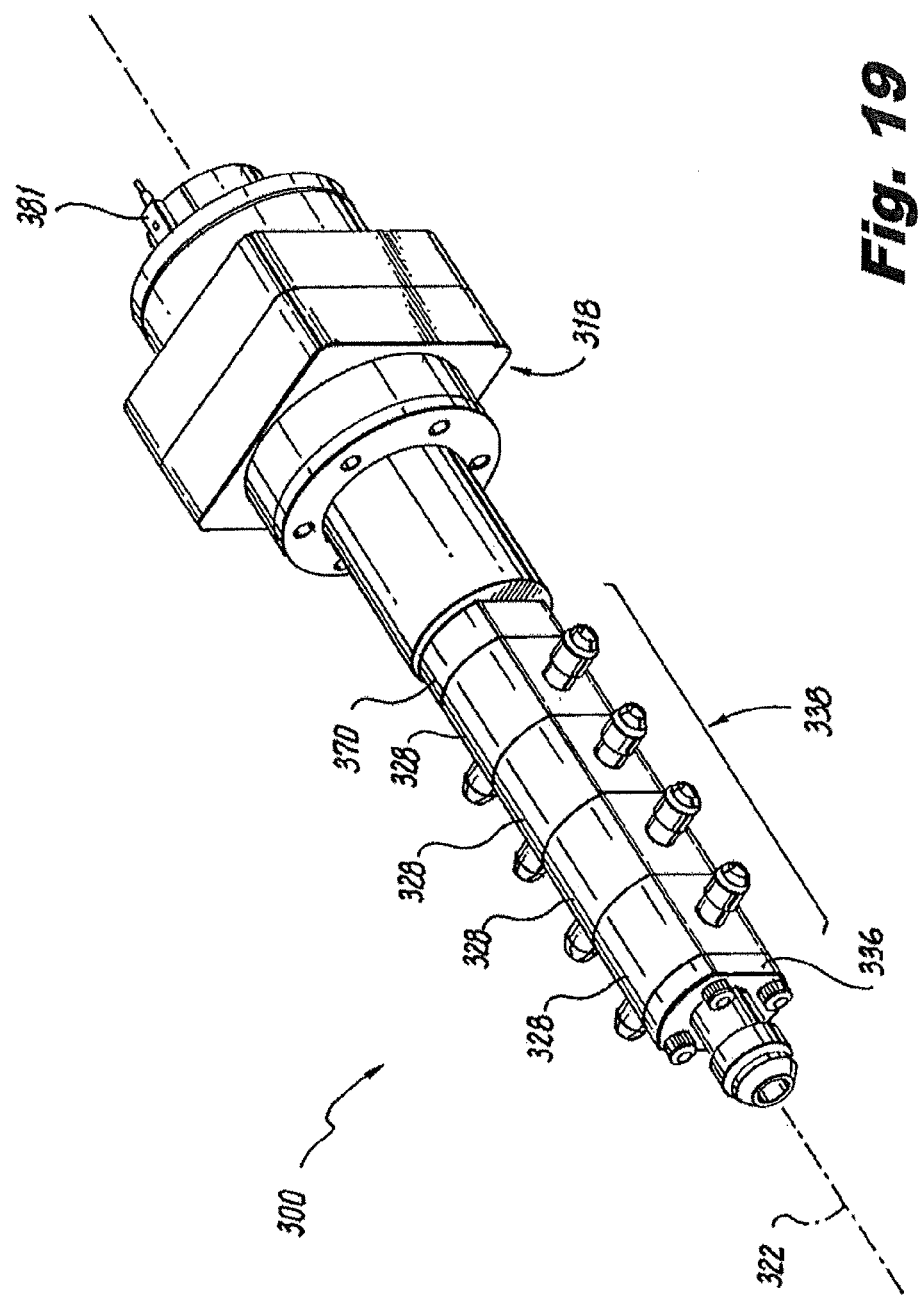
FIG. 19 is a perspective view of another exemplary embodiment of a fluid divider valve constructed in accordance with the present invention, showing the fluid inlet and outlets.
Figure 23:
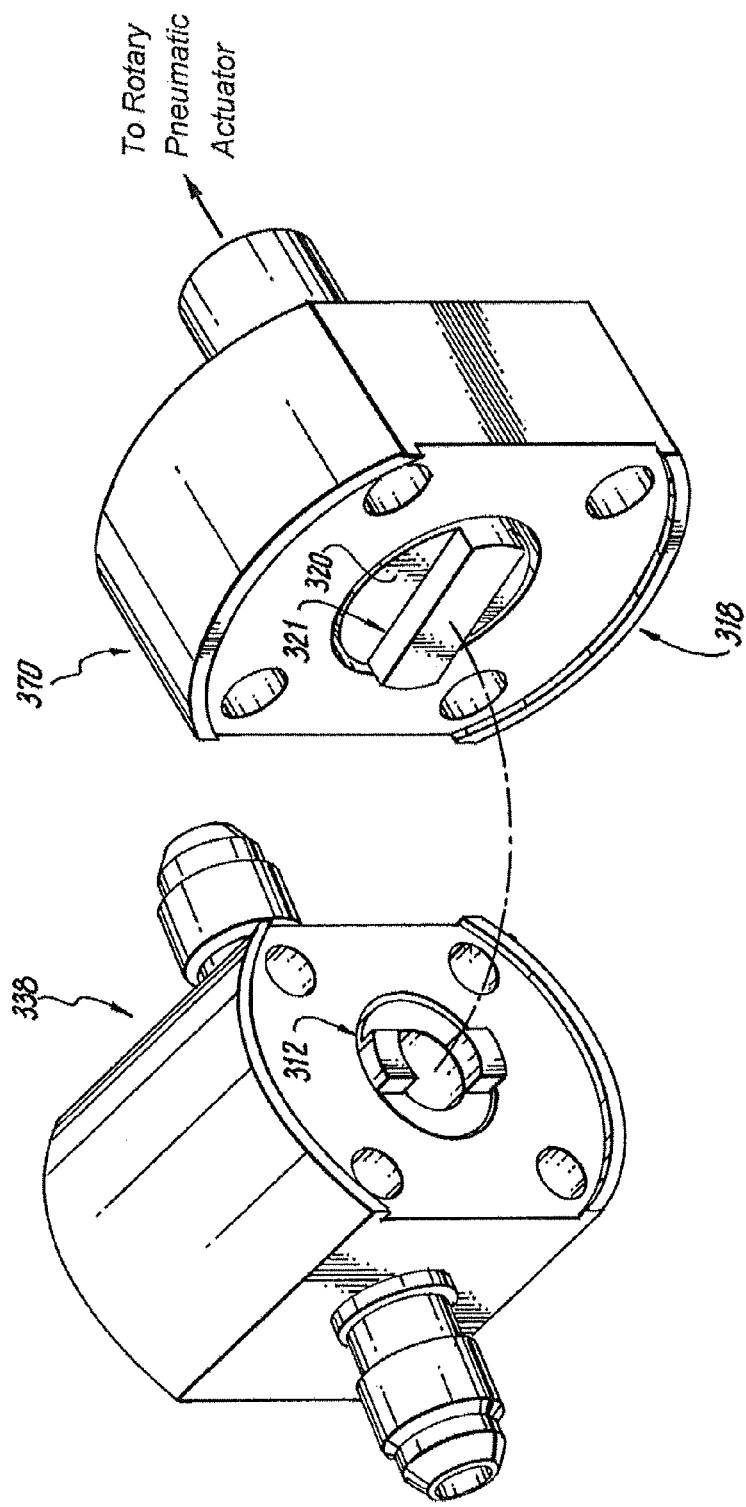
FIG. 23 is an exploded perspective view of a portion of the fluid divider valve of FIG. 19, showing the rotational actuator.

Referring now to FIG. 23, a terminal portion 370 of drive assembly 318 is shown. Terminal portion 370 is configured to engage valve shaft 312 to provide rotational movement between the opened and closed positions. Actuator 320 has a key 321 that engages a drive slot in an end of valve shaft 312 to provide the rotational movement. Drive assembly 318 includes a pair of limit switches 381, one of which is shown in FIG. 19, which serve for controls to limit the extent of rotational motion of actuator 320. Limit switches 381 operate on the Hall effect, however any other suitable type of limit switches can be used to accomplish the same function. Drive assembly 318 includes a rotary actuator having an internal vane that is sealed along its edges that can be driven by pressure through a partial rotation. Any other suitable type of rotary actuator can also be used without departing from the spirit and scope of the invention.

With any of fluid divider valves 100, 200, 300, the designs permit the use of electronic position sensors on the actuators to provide valve position feedback to a valve control system. Those skilled in the art will readily appreciate how to configure such sensors for a given application.

The methods and systems of the present invention, as described above and shown in the drawings, provide for a fluid divider valve with superior properties including prevention of cross talk and backflow from the outlets. When used in dual-fuel gas turbine engines, for example, the fluid divider valves described herein can isolate each injector and supply line from the others when the engine is operating on gaseous fuels and can thus reduce or prevent corrosive compounds from corroding the components. Moreover, modular construction allows for easy maintenance and reconfiguration for different applications, as well as replacement of individual divider blocks, if necessary.

While shown and described herein in the context of a dual-fuel gas turbine engine, those skilled in the art will readily appreciate that fluid divider valves can be constructed accordance with the present invention for any suitable application in which it is desirable to open and close multiple fluid ports in fluid communication with a common fluid source. It is not necessary that fluid divider valves in accordance with the invention be used in on/off applications. They can be used in variable control valves with metering, with pilot/main fuel staging, or in any other suitable variable flow application.

While the embodiments above are shown and described as being modular, those skilled in the art will appreciate that non-modular fluid divider valves can be constructed with any suitable number of outlets without departing from the spirit and scope of the invention. Additionally, while the embodiments shown and described herein have even numbers of outlets, those skilled in the art will readily appreciate that odd numbers of outlets can also be used, for example by providing only one outlet in a divider block, without departing from the scope and spirit of the invention.

While the apparatus and methods of the subject invention have been shown an described with reference to preferred embodiments, those skilled in the art will readily appreciate that changes and/or modifications may be made thereto without departing from the spirit and scope of the subject invention.

What is claimed is:

1. A fluid divider valve comprising:
   a) a housing defining an internal longitudinal bore having a fluid inlet for receiving fluid, the housing defining a plurality of outlets in fluid communication with the longitudinal bore for distributing fluid to a plurality of fluid injectors, the housing including at least two divider blocks configured and adapted to be connected end to end with one another to form a divider block assembly, wherein each divider block defines a respective one of said plurality of outlets; and
   b) a valve shaft sealingly engaged within the longitudinal bore of the housing, the valve shaft having an internal longitudinal flow passage extending therethrough in fluid communication with the fluid inlet of the housing, the valve shaft having a plurality of radial fluid ports formed therein which extend from the internal longitudinal flow passage to an exterior portion of the valve shaft, wherein the valve shaft is mounted for movement relative to the housing between a first position in which the valve shaft permits fluid communication between the fluid inlet of the housing and each of the outlets of the housing simultaneously through the radial fluid ports of the valve shaft, and a second position in which the valve shaft prevents fluid communication between the fluid inlet and the outlets of the housing.

2. A fluid divider valve as recited in claim 1, further comprising a drive assembly engaged with the housing, the drive assembly including an actuator operably connected to the valve shaft, the actuator being configured and adapted to move the valve shaft between the first and second positions linearly along a longitudinal axis defined by the longitudinal bore of the housing.

3. A fluid divider valve as recited in claim 1, further comprising a drive assembly engaged with the housing, the drive assembly including an actuator operably connected to the valve shaft, the actuator being configured and adapted to move the valve shaft between the first and second positions rotationally about a longitudinal axis defined by the longitudinal bore of the housing.

4. A fluid divider valve as recited in claim 1, wherein the valve shaft includes an o-ring seal disposed thereon circumferentially aligned with and spaced apart from each radial fluid port for providing sealing engagement between the valve shaft and the longitudinal bore of the housing.

5. A fluid divider valve as recited in claim 1, wherein the valve shaft includes a plurality of seals each disposed around the valve shaft circumferentially providing sealing engagement between the valve shaft and the longitudinal bore of the housing.

6. A fluid divider valve as recited in claim 1, wherein the valve shaft includes a plurality of self-energizing seals each disposed around the valve shaft circumferentially providing sealing engagement between the valve shaft and the longitudinal bore of the housing.

7. A fluid divider valve as recited in claim 1, further comprising an inlet fitting engaged to the housing in fluid communication with the fluid inlet of the housing for connecting the housing to a source of pressurized fluid.

8. A fluid divider valve as recited in claim 1, further comprising a plurality of outlet fittings, wherein one outlet fitting is engaged with the housing in fluid communication with a respective one of the outlets of the housing for connecting the housing to a supply line of an injector external to the housing, and wherein each outlet fitting includes a metering orifice.

9. A valve divider block for a fluid divider valve comprising:
   a) a housing defining an internal longitudinal bore extending therethrough from a first end to a second end of the housing, the housing defining at least one outlet in fluid communication with the longitudinal bore, wherein the housing is configured and adapted to be connected end to end with adjacent housings to form a divider block assembly; and
   b) a valve shaft sealingly engaged within the longitudinal bore of the housing, the valve shaft having an internal longitudinal flow passage extending therethrough, the valve shaft having at least one radial fluid port formed therein which extends from the internal longitudinal flow passage to an exterior portion of the valve shaft, wherein the valve shaft is mounted for movement relative to the housing between a first position in which the valve shaft permits fluid communication along a flow path from the internal longitudinal fluid passage through the at least one radial fluid port of the valve shaft to the at least one outlet of the housing, and a second position in which the valve shaft prevents fluid communication along the flow path.

10. A valve divider block as recited in claim 9, wherein the housing includes a face seal disposed around an opening of the longitudinal bore in the first end of the housing, and wherein the second end of the housing is configured to sealingly engage the face seal of an adjacent valve divider block.

11. A valve divider block as recited in claim 9, wherein the housing defines at least one assembly bore substantially parallel to the longitudinal bore thereof, wherein the assembly bore is configured to receive a through bolt therethrough for fastening a plurality of divider blocks end to end.

12. A valve divider block as recited in claim 9, wherein the valve shaft is configured to connect end to end with valve shafts of adjacent divider blocks to transfer forces along the valve shafts to move the connected valve shafts between the first and second positions.

13. A valve divider block as recited in claim 9, wherein the housing includes two outlets and wherein each outlet includes an outlet fitting in fluid communication therewith for connecting the outlet to a supply line of an injector.

14. A fluid divider valve comprising:
   a) a divider block assembly including a plurality of divider block units each including a housing having at least one outlet in fluid communication with a longitudinal bore extending through the housing, wherein the housings are sealingly assembled together in a series, each divider block unit including a valve shaft sealingly engaged within the longitudinal bore of the housing, the valve shaft having an internal longitudinal flow passage extending therethrough and at least one radial fluid port formed therein which extends from the internal longitudinal flow passage to an exterior portion of the valve shaft, wherein the valve shaft is mounted for movement relative to the housing between a first position in which the valve shaft permits fluid communication along a flow path from the internal longitudinal fluid passage through the at least one radial fluid port of the valve shaft to the at least one outlet of the housing, and a second position in which the valve shaft prevents fluid communication along the flow path, each valve shaft connected in series for movement as a single valve shaft unit;
   b) an inlet assembly sealingly engaged to a first end of the divider block assembly, the inlet assembly being in fluid communication with the internal flow passages of the valve shafts; and
   c) a drive assembly engaged with a second end of the divider block assembly, the drive assembly including an actuator operably connected to the valve shaft unit, the actuator being configured and adapted to move the valve shafts between the first and second positions.

15. A fluid divider valve as recited in claim 14, further comprising a tension rod having a first end operably coupled to the actuator of the drive assembly, and a second end operably coupled to the valve shaft unit of the divider assembly, the tension rod running through the internal longitudinal flow passages of the valve shafts of the divider assembly compressing the valve shafts together end to end such that the valve shafts are configured for movement between the first and second positions as a single unit in a linear direction along an axis defined by the tension rod.

16. A fluid divider valve as recited in claim 15, further comprising an end cap connecting the second end of the tension rod to an end of the valve shaft unit, the end cap defining at least one fluid port therethrough providing fluid communication from the inlet assembly to the internal longitudinal flow passages of the valve shafts.

17. A fluid divider valve as recited in claim 15, wherein the housing of each divider block unit includes two outlets, wherein each valve shaft includes at least one radial port proximate each outlet, and wherein each valve shaft includes a plurality of seals disposed circumferentially around the valve shaft to seal the radial ports from the outlets in the second position.

18. A fluid divider valve as recited in claim 15, wherein the housing of each divider block unit includes two outlets, wherein each valve shaft includes at least one radial port proximate a first one of the two outlets, and wherein each valve shaft includes a partial radial port defined in an end thereof, wherein the partial radial port forms a radial port with an end of an adjacent valve shaft that is proximate the second of the two outlets in the respective housing.

19. A fluid divider valve as recited in claim 15, wherein the first end of the tension rod is coupled to the actuator of the drive assembly by a clevis and pin connection.

20. A fluid divider valve as recited in claim 14, wherein each of the valve shafts includes drive tangs on a first end thereof and drive slots on a second end thereof, the drive tangs being configured to mesh with drive slots of an adjacent valve shaft to provide rotational engagement of the valve shafts with one another, wherein the valve shafts are configured for rotational movement between the first and second positions as a single unit in a rotational direction about an axis defined by the internal longitudinal flow passages, and wherein the actuator is configured and adapted to rotate the valve shaft between the first and second positions.

* * * * *